US012184002B2

(12) United States Patent
Gondo

(10) Patent No.: US 12,184,002 B2
(45) Date of Patent: Dec. 31, 2024

(54) CONNECTOR

(71) Applicant: Molex, LLC, Lisle, IL (US)

(72) Inventor: Daishi Gondo, Yamato (JP)

(73) Assignee: Molex, LLC, Lisle, IL (US)

( * ) Notice: Subject to any disclaimer, the term of this patent is extended or adjusted under 35 U.S.C. 154(b) by 377 days.

(21) Appl. No.: 17/603,583

(22) PCT Filed: Apr. 23, 2020

(86) PCT No.: PCT/JP2020/017438
§ 371 (c)(1),
(2) Date: Oct. 14, 2021

(87) PCT Pub. No.: WO2020/218400
PCT Pub. Date: Oct. 29, 2020

(65) Prior Publication Data

US 2022/0200186 A1 Jun. 23, 2022

Related U.S. Application Data

(60) Provisional application No. 62/838,345, filed on Apr. 25, 2019.

(51) Int. Cl.
*H01R 12/71* (2011.01)
*H01R 12/57* (2011.01)
(Continued)

(52) U.S. Cl.
CPC ........... *H01R 12/716* (2013.01); *H01R 12/57* (2013.01); *H01R 12/707* (2013.01);
(Continued)

(58) Field of Classification Search
CPC .... H01R 12/716; H01R 12/57; H01R 12/707; H01R 13/405; H01R 13/447;
(Continued)

(56) References Cited

U.S. PATENT DOCUMENTS 2,433,358 A 12/1947 Garberding
6,503,101 B1 1/2003 Yu
(Continued)

FOREIGN PATENT DOCUMENTS

CN 101436739 A 5/2009
CN 102292874 A 12/2011
(Continued)

OTHER PUBLICATIONS

Ex parte Quayle office action received for U.S. Appl. No. 29/745,812, mailed on Jan. 17, 2023, 6 pages.
(Continued)

*Primary Examiner* — Abdullah A Riyami
*Assistant Examiner* — Nelson R. Burgos-Guntin

(57) ABSTRACT

To provide a connector that is compact and reliable and can easily be produced, in addition to achieving narrow spacing between protruding parts having a plurality of terminals mounted thereto. Such a connector is therefore provided that includes half body parts, each of which includes a connector main body and a plurality of terminals mounted to the connector main body, and a main body end part formed on each end of the connector main body with the connector main bodies of the half body parts opposite each other. The connector main body is an integrated member and includes a protruding part that extends in the longitudinal direction thereof and holds the terminals, along with an embedded part connected to each end in the longitudinal direction of the protruding part. The main body end part includes a cover part that covers at least part of the embedded part of the connector main body. The cover part is a member integrated with the embedded part.

20 Claims, 15 Drawing Sheets

(51) Int. Cl.

| | |
|---|---|
| ***H01R 12/70*** | (2011.01) |
| ***H01R 13/405*** | (2006.01) |
| ***H01R 13/447*** | (2006.01) |
| ***H01R 13/504*** | (2006.01) |
| ***H01R 13/627*** | (2006.01) |
| ***H01R 13/631*** | (2006.01) |
| ***H01R 13/639*** | (2006.01) |
| *H01R 13/629* | (2006.01) |

(52) U.S. Cl.
CPC ......... *H01R 13/405* (2013.01); *H01R 13/447* (2013.01); *H01R 13/504* (2013.01); *H01R 13/6275* (2013.01); *H01R 13/631* (2013.01); *H01R 13/6395* (2013.01); *H01R 13/629* (2013.01)

(58) Field of Classification Search
CPC ......................... H01R 13/504; H01R 13/6275; H01R 13/631; H01R 13/6395; H01R 13/629; H01R 12/73; H01R 12/7088; H01R 13/20; H01R 12/71; H01R 13/502; H01R 13/627; H01R 24/00; H01R 24/005
See application file for complete search history.

(56) References Cited

U.S. PATENT DOCUMENTS

| | | | | |
|---|---|---|---|---|
| 8,888,506 | B2 | 11/2014 | Nishimura et al. | |
| 8,986,027 | B2 | 3/2015 | Nishimura et al. | |
| 10,784,616 | B2 * | 9/2020 | Gondo | H01R 13/41 |
| D918,843 | S | 5/2021 | Furukawa | |
| D922,958 | S | 6/2021 | Yokoyama | |
| 11,095,059 | B2 * | 8/2021 | Gondo | H01R 13/447 |
| D960,107 | S | 8/2022 | Williams Barnett | |
| D967,776 | S | 10/2022 | Kobuchi | |
| D971,152 | S | 11/2022 | Horino | |
| 11,658,431 | B2 * | 5/2023 | Gondo | H01R 12/57 439/660 |
| 11,764,510 | B2 * | 9/2023 | Tanaka | H01R 12/73 439/74 |
| 2005/0032400 | A1 | 2/2005 | Zhang et al. | |
| 2005/0042924 | A1 | 2/2005 | Zhang et al. | |
| 2006/0063432 | A1 | 3/2006 | Chen | |
| 2006/0276061 | A1 | 12/2006 | Koguchi et al. | |
| 2008/0176429 | A1 | 7/2008 | Zhang | |
| 2008/0207014 | A1 | 8/2008 | Takeuchi et al. | |
| 2008/0261462 | A1 | 10/2008 | Mizumura | |
| 2008/0305657 | A1 | 12/2008 | Midorikawa | |
| 2009/0061655 | A1 | 3/2009 | Miyazaki et al. | |
| 2010/0068900 | A1 | 3/2010 | Wu et al. | |
| 2011/0263140 | A1 | 10/2011 | Sato et al. | |
| 2013/0012039 | A1 | 1/2013 | Nose et al. | |
| 2013/0137308 | A1 | 5/2013 | Chiang | |
| 2013/0330943 | A1 | 12/2013 | Sasaki et al. | |
| 2013/0337681 | A1 | 12/2013 | Little | |
| 2015/0079816 | A1 | 3/2015 | Suzuki | |
| 2015/0140840 | A1 | 5/2015 | Nishimura et al. | |
| 2015/0140841 | A1 | 5/2015 | Watanabe | |
| 2015/0207248 | A1 | 7/2015 | Takenaga et al. | |
| 2015/0263464 | A1 | 9/2015 | Arichika | |
| 2016/0036145 | A1 | 2/2016 | Hasegawa | |
| 2016/0073486 | A1 | 3/2016 | Teramoto | |
| 2016/0190719 | A1 | 6/2016 | Brzezinski et al. | |
| 2017/0098900 | A1 * | 4/2017 | Kobuchi | H01R 13/405 |
| 2020/0044374 | A1 | 2/2020 | Ishida | |
| 2020/0067227 | A1 * | 2/2020 | Gondo | H01R 13/41 |
| 2020/0127400 | A1 * | 4/2020 | Sasayama | H01R 4/02 |
| 2020/0343659 | A1 * | 10/2020 | Gondo | H01R 13/502 |
| 2020/0343660 | A1 * | 10/2020 | Gondo | H01R 13/6275 |
| 2021/0351527 | A1 * | 11/2021 | Gondo | H01R 13/11 |
| 2022/0131303 | A1 * | 4/2022 | Tanaka | H01R 12/716 |
| 2022/0247104 | A1 * | 8/2022 | Miyahara | H01R 12/716 |
| 2023/0261401 | A1 * | 8/2023 | Yayoshi | H01R 43/24 439/78 |
| 2023/0291153 | A1 * | 9/2023 | Ebisawa | H01R 12/714 |

FOREIGN PATENT DOCUMENTS

| | | | |
|---|---|---|---|
| CN | 202103222 | U | 1/2012 |
| CN | 205178062 | U | 4/2016 |
| CN | 106067623 | A | 11/2016 |
| CN | 109038013 | A | 12/2018 |
| IN | 103168395 | A | 6/2013 |
| JP | H10125420 | A | 5/1998 |
| JP | 2001126789 | A | 5/2001 |
| JP | 3368471 | B2 | 1/2003 |
| JP | 2005100903 | A | 4/2005 |
| JP | 2005510850 | A | 4/2005 |
| JP | 2014056762 | A | 3/2014 |
| JP | 2014075295 | A | 4/2014 |
| JP | 2016096079 | A | 5/2016 |
| JP | 2017111931 | A | 6/2017 |
| JP | 6174005 | B2 | 8/2017 |
| JP | 2018081569 | A | 5/2018 |
| JP | 2018081869 | A | 5/2018 |
| JP | 2019003918 | A | 1/2019 |
| JP | 7403614 | B2 | 12/2023 |
| KR | 20130129111 | A | 11/2013 |
| KR | 20140044738 | A | 4/2014 |
| KR | 20150110313 | A | 10/2015 |
| KR | 20180072533 | A | 6/2018 |
| KR | 20180123980 | A | 11/2018 |
| KR | 20180134752 | A | 12/2018 |
| TW | D195136 | S | 1/2019 |
| WO | 2019021611 | A1 | 1/2019 |

OTHER PUBLICATIONS

International Search Report and Written Opinion received for PCT Application No. PCT/JP2020/017438, mailed on Jun. 30, 2020, 13 pages (6 pages of English translation and 7 pages of original document).

Notice of Allowance received for CN Application No. 202010325633.5, mailed on Sep. 3, 2021, 07 Pages (03 Pages of English Translation and 04 Pages of Official notification).

Notice of Allowance received for U.S. Appl. No. 18/387,070, mailed on Jun. 5, 2024, 9 pages.

* cited by examiner

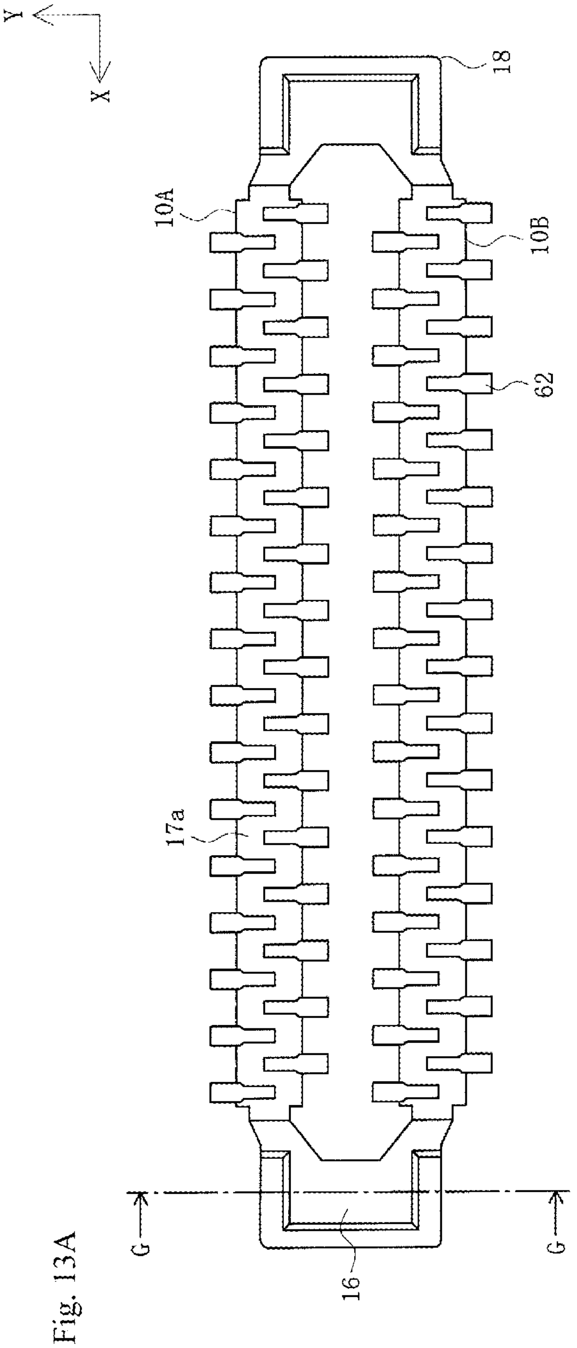
Fig. 13A
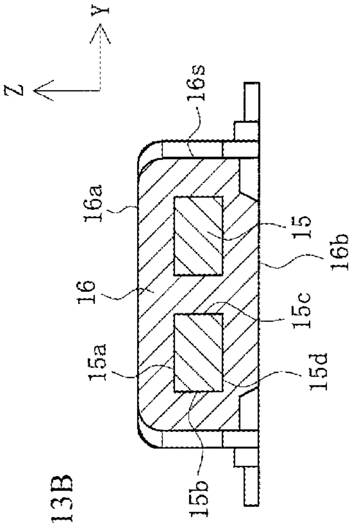
Fog. 13B

Prior art

CONNECTOR

RELATED APPLICATIONS

This application is a national phase of PCT/JP2020/017438 filed on Apr. 23, 2020, which claims priority to U.S. Provisional Patent Application No. 62/838,345 filed Apr. 25, 2019. The priority of the foregoing applications are hereby claimed, and the disclosure incorporated herein by reference in their entireties.

TECHNICAL FIELD

The present disclosure relates to a connector.

BACKGROUND

Conventionally, connectors such as substrate-to-substrate connectors have been used to electrically connect pairs of parallel circuit boards to each other. These types of connectors are attached to both opposing surfaces of a pair of circuit boards and fitted together to ensure electric conduction (for example, see Patent Reference 1).

FIG. 15 is a perspective view illustrating a conventional connector.

In the drawing, 811 is a connector housing mounted on a circuit board (not illustrated), which has a pair of protruding parts 812 extending in the longitudinal direction thereof. Furthermore, a plurality of terminals 861 are mounted to the protruding parts 812 side by side in the longitudinal direction of the connector.

Moreover, when the connector is mated with a mating connector (not illustrated), the protruding parts 812 are inserted into each of the pair of recessed grooves formed in the mating housing of the mating connector. This process allows the respective terminals 861 to contact mating terminals (not illustrated) mounted side by side in the recessed groove and to establish electrical conduction.

Prior Art Documents: Patent Documents Patent Reference 1: Japanese Unexamined Patent Application Publication No. 2001-126789

SUMMARY

However, in conventional connectors, the terminals 861 are integrated with the housing 811, making the connector more compact and reducing the spacing between the protruding parts 812, thereby reducing the pitch between the terminals 861. Consequently, production of the connector is made more difficult. The terminals 861 are usually formed so as to be integrated with the pair of protruding parts 812 of the housing 811 using a method of molding referred to as overmolding or insert molding. Using this method leads to narrower spacing between the protruding parts 812 and narrower pitch between the terminals 861, making it difficult to precisely deploy a large number of terminals 861 in a mold for molding the housing 811 corresponding to the pair of protruding parts 812.

In order to overcome the above issues in conventional connectors, an object herein is to provide a compact and reliable connector that can be easily produced, while achieving narrower spacing between the protruding parts having a plurality of terminals mounted.

From the above viewpoint, a connector includes half body parts, each of which includes a connector main body and a plurality of terminals mounted on the connector main body, and a main body end part formed on each end of the connector main body with the connector main bodies of the half body parts facing each other. The connector main body includes a protruding part, which is a member integrated with the terminals, that extends in the longitudinal direction of the connector main body and holds the terminals, and an embedded part connected to each end in the longitudinal direction of the protruding part. The main body end part includes a cover part that covers at least part of the embedded part of the connector main body. The cover part is a member integrated with the embedded part.

In another connector, the entire embedded part is covered by the cover part such that an end wall inner surface, oriented toward the middle in the longitudinal direction of the connector main body, is formed on the cover part.

In still another connector, the embedded part has an inner surface, as a surface facing the other embedded part, an outer surface opposite the inner surface in the longitudinal direction of the connector main body, an upper surface and a lower surface that connect the inner surface and the outer surface, and an end surface located at one end in the longitudinal direction of the connector main body. At least the inner surface, the outer surface, the upper surface, the lower surface, and the end surface are covered by the cover part.

In still another connector, the embedded part includes an inclined inner surface, as one surface facing another, that faces the other such that a gap becomes larger toward the middle in the longitudinal direction of the connector main body. The cover part includes an end wall inner surface oriented toward the middle in the longitudinal direction of the connector main body. The end wall inner surface is formed by injecting a molding material of the cover part into the gap between the inclined inner surfaces.

In still another connector, an extension end part is connected to each end in the longitudinal direction of the protruding part, with the embedded part extending from the extension end part.

In still another connector, the extension end part of the connector main body extends from each end in the longitudinal direction of the protruding part while being inwardly inclined in the width direction of the connector main body. The main body end part has a narrower width than the width of the connector main body.

A connector pair consists of a connector according to the present disclosure and a mating connector that mates with the connector.

According to the present disclosure, a connector is provided that is compact and reliable and can easily be produced, while achieving narrower spacing between the protruding parts having a plurality of terminals mounted thereon.

BRIEF DESCRIPTION OF THE DRAWINGS

FIGS. 5A-5B provide a two view drawing illustrating a first process to produce a first protruding end part of the first connector according to Embodiment 1, wherein FIG. 5A is a top view, while FIG. 5B is a bottom view.

FIGS. 6A-6B provide a two view drawing illustrating a second process to produce the first protruding end part of the first connector according to Embodiment 1, wherein FIG. 6A is a top view, while FIG. 6B is a bottom view.

FIGS. 7A-7B provide enlarged views illustrating the essential parts of the first and second processes to produce the first protruding end part of the first connector according to Embodiment 1, wherein FIG. 7A is an enlarged view of part E of FIG. 5B, while FIG. 7B is an enlarged view of part F of FIG. 6B.

FIGS. 8A-8D provide cross-sectional drawings illustrating the first and second processes to produce the first protruding end part of the first connector according to Embodiment 1, wherein FIG. 8A is a cross-sectional drawing along arrow A-A of FIG. 5A, FIG. 8B is a cross-sectional drawing along arrow B-B of FIG. 5A, FIG. 8C is a cross-sectional drawing along arrow C-C of FIG. 6A, and FIG. 8D is a cross-sectional drawing along arrow D-D of FIG. 6A.

FIGS. 13A-B provide a first two view drawing illustrating the first protruding end part of the first connector according to Embodiment 2, wherein FIG. 13A is a bottom view, while FIG. 13B is a cross-sectional drawing along arrow G-G of FIG. 13A.

FIGS. 14A-B provide a second two view drawing illustrating the first protruding end part of the first connector according to Embodiment 2, wherein FIG. 14A is a side view, while FIG. 14B is a cross-sectional drawing along arrow H-H of FIG. 14A.

DETAILED DESCRIPTION OF THE PREFERRED EMBODIMENTS

Embodiments will hereinafter be described in detail with reference to the drawings.

Figure 1:
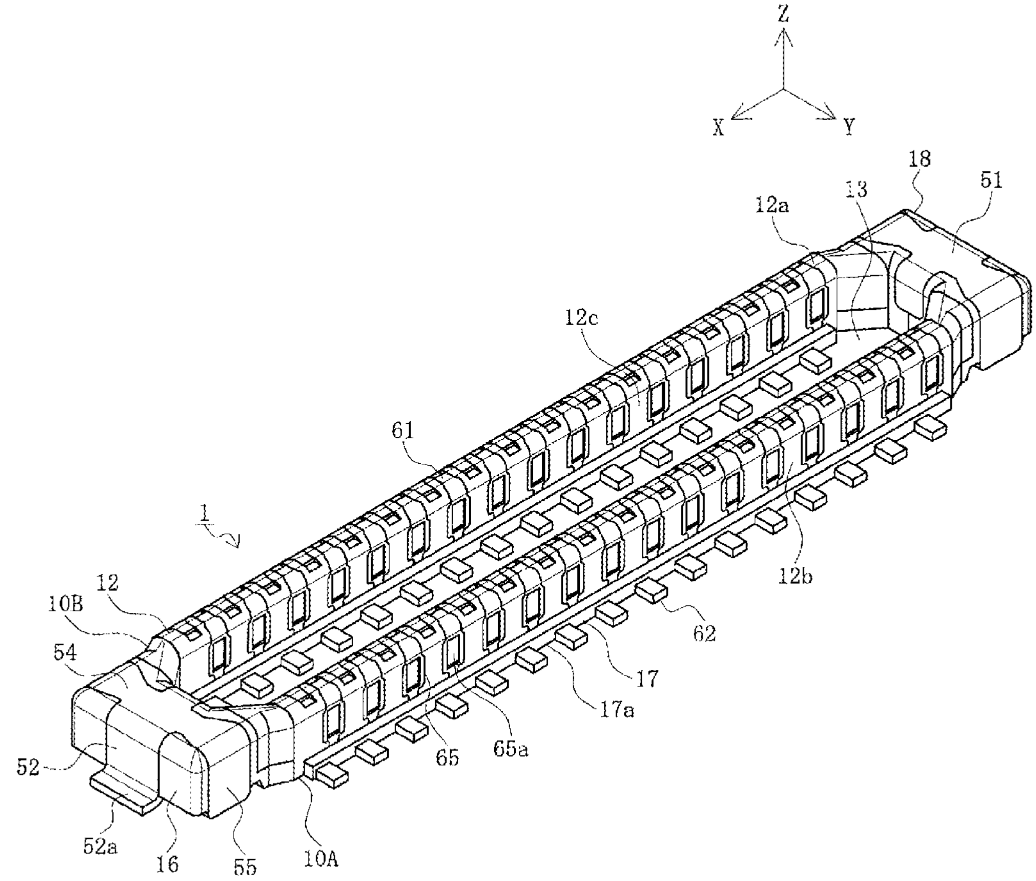
FIG. 1 is a perspective view of a first connector according to Embodiment 1.
Figure 2:
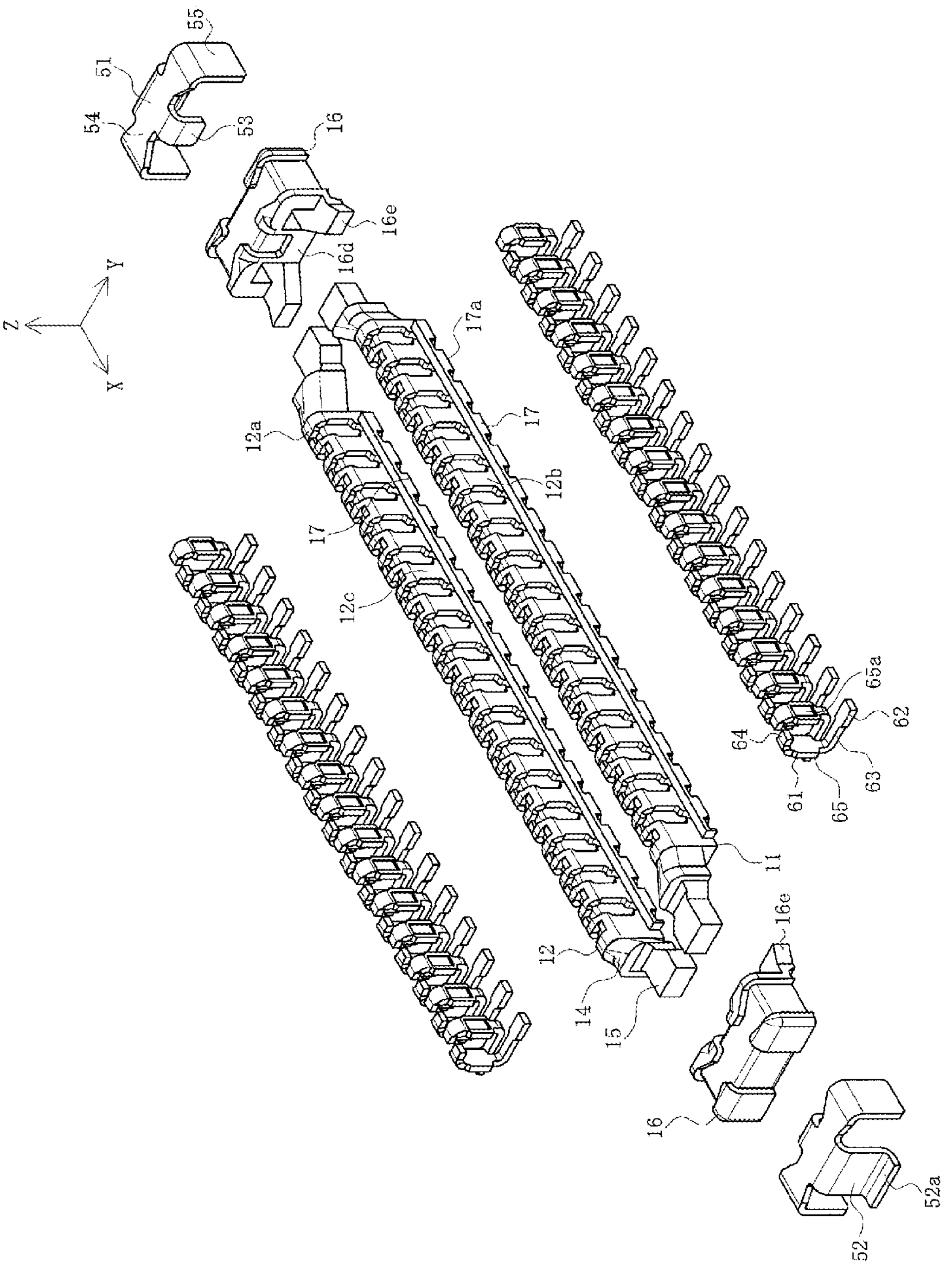
FIG. 2 is an exploded view of the first connector according to Embodiment 1.
Figure 3:
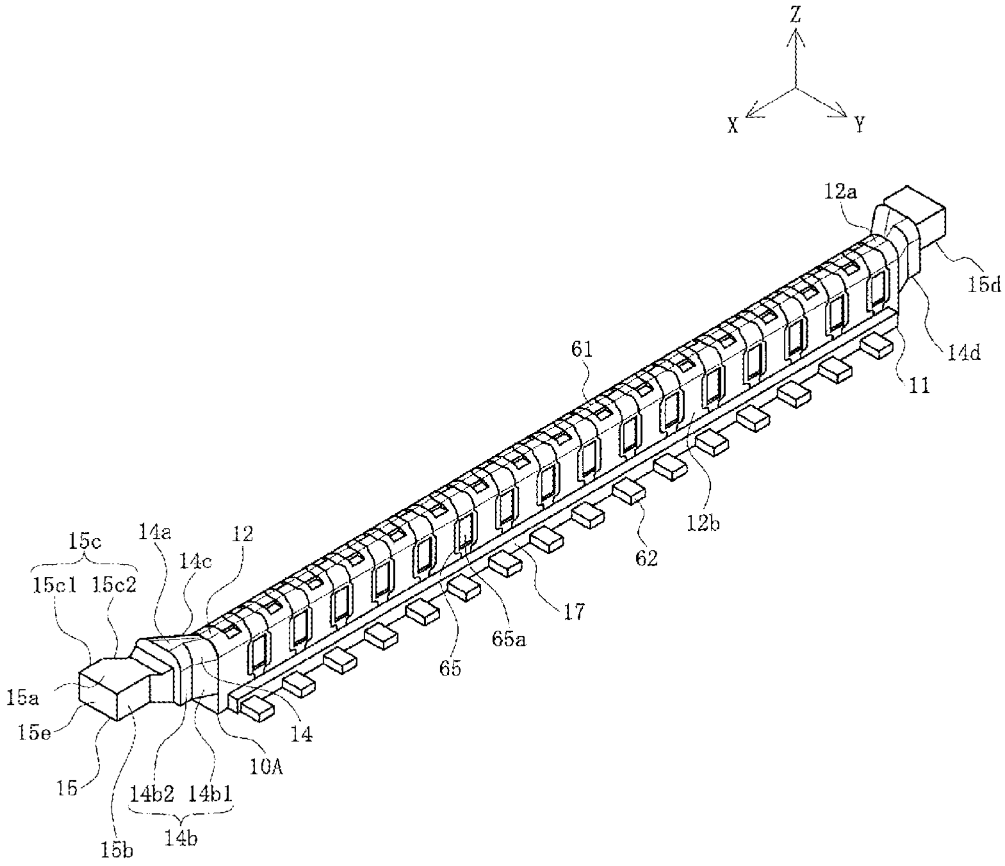
FIG. 3 is a perspective view of a left half body part of the first connector according to
Embodiment 1.

FIG. 1 is a perspective view illustrating the first connector according to Embodiment 1, FIG. 2 is an exploded view illustrating the first connector according to Embodiment 1, and FIG. 3 is a perspective view illustrating a left half body part of the first connector according to Embodiment 1.

In the diagrams, 1 is a first connector as one of a pair of board to board connectors, which are connectors in the present embodiment. The first connector 1 is a surface mounting type connector mounted on the surface of a first substrate (not illustrated) serving as a mounting member and is mated to a second connector 101 (described below) that serves as a mating connector. Furthermore, the second connector 101 is the other of the pair of board to board connectors and is a surface mount type connector mounted on the surface of a second substrate (not illustrated) serving as a mounting member.

The first connector 1 and the second connector 101 according to the present embodiment are preferably used to electrically connect the first substrate to the second substrate, but can also be used to electrically connect other members. For example, the first substrate and the second substrate are each a printed circuit board, a flexible flat cable (FFC), a flexible circuit board (FPC) or the like as used in electronic devices or the like, but may be any type of substrate.

In addition, in the present embodiment, expressions indicating direction such as top, bottom, left, right, front, rear, and the like used to describe the configuration and operation of each part of the first connector 1 and the second connector 101 are relative rather than absolute and are appropriate when each part of the first connector 1 and the second connector 101 are in the positions illustrated in the drawings; that said, these directions should be interpreted as changing in accordance with the change in position when the position thereof is changed.

Furthermore, the first connector 1 is composed of a pair of right and left half body parts, or a left half body part 10A and a right half body part 10B, joined by a first reinforcement fitting 51 as a reinforcement fitting and a cover part 16 integrally molded by a method of molding called overmolding, outsert molding, or insert molding (hereinafter, referred to as "insert molding"). Note that as the left half body part 10A and the right half body part 10B are the same members arranged so as to face each other on the left and right sides, they will be described as half body part 10 when comprehensively described. The left half body part 10A and the right half body part 10B are each substantially gate shaped (a shape projected on the X-Y plane) in a plan view, with the space between the left half body part 10A and the right half body part 10B that are joined together being a long and narrow recessed groove part 13 extending in the longitudinal direction (X-axis direction) of the first connector 1. The recessed groove part 13 is a through hole that is open on the upper face and the lower face of the first connector 1.

Note that in the present embodiment, for convenience of description, the first connector 1 is described as having a pair of half body parts 10, that is, a configuration in which two of the half body parts 10 are arranged in parallel; however, three or more of the half body parts 10 may be arranged in parallel. Furthermore, the half body part 10 does not necessarily need to be substantially gate shaped and may have any shape provided that both ends in the longitudinal direction can be joined by the first reinforcement fitting 51 and the cover part 16.

The half body part 10 has a first housing 11 as a connector body which is integrally formed by an insulating material such as a synthetic resin and a shape which is substantially gate shaped in a plan view. Each first housing 11 includes a narrow long band shaped bottom plate part 17 stretching in the longitudinal direction (X-axis direction) of the first housing 11 and a first protruding part 12 as a narrow long protruding part stretching in the longitudinal direction of the first housing 11 integrally formed on the upper surface of the bottom plate part 17. The first protruding part 12 is a member having a cross section shaped similar to an upside-down U and has a curved mating surface 12*a* positioned on the top (Z-axis positive direction) along with both an outer surface 12*b* and an inner surface 12*c* that are connected to both the right and left sides of the mating surface 12*a*. The outer surface 12*b* and the inner surface 12*c* are a pair of flat surfaces that face each other in parallel and extend in the longitudinal direction of the first housing 11. Note that the dimension in the width direction (Y-axis direction) of the first protruding part 12 is shorter than the dimension in the width direction of the bottom plate part 17, such that the bottom plate part 17 protrudes outward in the width direction from the outer surface 12*b* and the inner surface 12*c* at the lower end (the end in the Z-axis negative direction) of the first protruding part 12. Furthermore, the bottom surface of the bottom plate part 17 is a mounting surface 17*a* of the first housing 11 that faces the surface of the first substrate.

In addition, a first terminal 61 as a terminal is disposed on each first protruding part 12. The first terminals 61 are disposed in a prescribed number (32 in the example illustrated in the drawing) and at a prescribed pitch. The first terminal 61 is a member integrally formed by punching, bending, or the like on a conductive metal plate, and includes: a main body part 63 extending in the width direction of the first protruding part 12; a tail part 62 connected to a first end of the main body part 63; a contact part 65 connected to a second end of the main body part 63 at an angle of approximately 90 degrees and extending in the height direction; and an upper end part 64 connected to the upper end of the contact part 65 at an angle of approximately 90 degrees.

The main body part 63 is a part embedded and held in the bottom plate part 17. Furthermore, the tail part 62 extends outward in the width direction from the bottom plate part 17 and is connected by soldering or the like to a connection pad connected to a conductive trace of the first substrate. The conductive trace is typically a signal line. Furthermore, the contact part 65 includes a contact recessed part 65*a* that is a portion contacting the second terminals 161 (described below) of the second connector 101 when the first connector 1 and the second connector 101 are mated, and, preferably, is a portion depressed from the surface.

The first terminal 61 is integrated with the first housing 11 through insert molding. In other words, the first housing 11 is molded by setting the first terminals 61 inside and then filling in the cavity of the metal mold with an insulating material. As a result, the first terminals 61 are integrally mounted to the first housing 11, with the lower surfaces of the main body part 63 and the tail part 62 exposed to the mounting surface 17*a* of the bottom plate part 17, and with the surfaces of the contact part 65 and the upper end part 64 exposed to the outer surface 12*b* or the inner surface 12*c* of the first protruding part 12 and to the mating surface 12*a*.

Furthermore, the first terminal 61 mounted on each first protruding part 12 is oriented such that adjacent objects face opposite in the width direction of the first protruding part 12. In the example illustrated in the diagram, among the first terminals 61 mounted to the first protruding part 12 of the left half body part 10A, the first terminal 61 positioned at the front end (the end in the X-axis positive direction) is oriented such that the tail part 62 protrudes outward (in the Y-axis positive direction), while the first terminal 61 positioned second from the front end is oriented such that the tail part 62 protrudes inward (in the Y-axis negative direction). In this manner, as the first terminals 61 are mounted on the first protruding part 12 arranged in a line in mutually opposing directions, the pitch of the tail parts 62 protruding from both sides of the first protruding part 12 is twice that of the pitch of the first terminal 61. This configuration facilitates the operation to connect the first terminal 61 to the connection pad of the first substrate by soldering or the like. The pitch of the contact part 65 exposed on the outer surface 12*b* of the first protruding part 12 and the pitch of the contact part 65 exposed on the inner surface 12*c* are also twice the pitch of the first terminal 61.

Note that as the first terminal 61 is a member that will be integrated into the first housing 11 using insert molding or the like, the terminals are not meant to exist separated from the first housing 11; however, note that the terminals are illustrated separately from the first housing 11 in FIG. 2 for convenience of explanation.

Moreover, the first protruding end parts 18, which are main body end parts and function as mating guide parts, are disposed on both ends in the longitudinal direction of the first protruding part 12. The first protruding end parts 18 are members connected to both ends in the longitudinal direction of each first protruding part 12 and are formed so as to join the left half body part 10A and the right half body part 10B. Moreover, in a state in which the first connector 1 and the second connector 101 are mated, the first protruding end part 18 functions as an insertion protruding part that is inserted into a mating recessed part 122 (described below) of the second protruding end part 121 of the second connector 101.

The first protruding end part 18 consists of an extension end part 14 of the left and right half body parts 10, an embedded part 15, as well as a cover part 16 and a first reinforcement fitting 51.

The extension end parts 14 extending in the longitudinal direction are respectively integrally connected to both ends in the longitudinal direction of the first protruding part 12 of the half body part 10, while the embedded parts 15 further extending in the longitudinal direction of the first protruding part 12 are respectively integrally connected to each extension end part 14. Note that the extension end parts 14 extend inclined obliquely inward, while the embedded parts 15 extend in the longitudinal direction from an inwardly-eccentric position at the tip of the extension end parts 14 and are positioned inward from the outer surface 12*b* of the first protruding part 12. In other words, the extension end part 14 of the left half body part 10A extends obliquely in the right direction (Y-axis negative direction), while the embedded part 15 extends longitudinally from a position eccentric in the right direction at the tip of the extension end part 14. In addition, the extension end part 14 of the right half body part 10B extends obliquely in the left direction (Y-axis positive direction), while the embedded part 15 extends longitudinally from a position eccentric in the left direction at the tip of the extension end part 14. As described above, since the embedded part 15 is eccentric with respect to the extension end part 14, the embedded part 15 is capable of being formed in a fashion such that it sticks out toward the inside of the extension end part 14. This manner of formation allows the inside of the embedded part 15 closer to the first protruding part 12 to be covered by resin with which the end wall inner surface 16*d* of the cover part 16 is formed. The strength of integration is therefore further enhanced.

Furthermore, at least part of the extension end part 14 of the left and right half body parts 10 and the entire embedded part 15 are covered by a cover part 16 formed from an insulating material such as a synthetic resin or the like. Specifically, the cover part 16 is formed by performing insert molding with the embedded parts 15 of the right and left half body parts 10 arranged adjacent to one another and covered by the first reinforcement fitting 51. As a result, the extension end part 14 and the embedded part 15 of the left and right half body parts 10, along with the first protruding end part 18, in which the cover part 16 and the first reinforcement fitting 51 are integrated, are formed and the left and right half body parts 10 are joined. The cover part 16 does not necessarily cover the entire embedded part 15, but may cover the embedded part 15 to a degree sufficient to join the right and left half body parts 10. However, the entire embedded part 15 is preferably covered to increase the binding strength to the highest degree. The cover part 16 is a member formed so as to be integrated with other members by insert molding and is not an independent member separate from other members. It should, however, be noted that, for convenience of illustration, the cover part 16 in FIG. 2 is depicted as if it were an independent member.

As illustrated in FIG. 3, the extension end part 14 has an upper surface 14*a* located on the top, an outer surface 14*b* and an inner surface 14*c* connected to the right and left ends of the upper surface 14*a*, and a lower surface 14*d* located on the bottom. The lower surface 14*d* is located above the mounting surface 17*a* and is at least partially covered by the cover part 16. The upper surface 14*a* is substantially flush with the mating surface 12*a* of the first protruding part 12. The inner surface 14*c* is a surface inwardly inclined relative to the inner surface 12*c* of the first protruding part 12. The outer surface 14*b* includes an inclined outer surface 14*b*1 inwardly inclined relative to the outer surface 12*b* of the first protruding part 12 and a parallel outer surface 14*b*2 substantially parallel with the outer surface 12*b* of the first protruding part 12. The parallel outer surface 14*b*2 is substantially flush with the outer surface of the cover part 16 and constitutes a part of the outer surface of the first protruding end part 18. The cover part 16 includes an extended cover part 16*e* that is extended so as to be integrated with the lower surface 14*d* of the extension end part 14. The extended cover part 16*e* can increase the contact area between the cover part 16 and the first housing 11, further enhancing the strength of integration. Although preferable, the lower surface of the extended cover part 16*e* is not necessarily flush with the mounting surface 17*a*. Formation of the lower surface of the extended cover part 16*e* that is flush with the mounting surface 17*a* can increase the mounting surface of the first connector 1 to the first substrate, which is beneficial in terms of stabilizing the mounting state.

The embedded part 15 is a member in which the entire shape thereof is substantially rectangular parallelepiped and has five surfaces, including: an upper surface 15*a* located on the top; an outer surface 15*b* and an inner surface 15*c* located on the right and left; a lower surface 15*d* located on the bottom; and an end surface 15*e* located at the end in the longitudinal direction of the first connector 1. The upper surface 15*a* and the lower surface 15*d* are flat surfaces parallel with each other. The distance between the upper surface 15*a* and the lower surface 15*d*, that is, the thickness of the embedded part 15, is less than the thickness of the extension end part 14 and the thickness of the first protruding part 12. The upper surface 15*a* is located below the mating surface 12*a*, while the lower surface 15*d* is located above the mounting surface 17*a*. The outer surface 15*b* is a flat surface substantially parallel with the outer surface 12*b* of the first protruding part 12 and is positioned inside relative to the outer surface 12*b*, in other words, closer to the middle in the width direction of the first housing 11. The inner surface 15*c* includes a parallel inner surface 15*c*1 that is a flat surface substantially parallel with the inner surface 12*c* of the first protruding part 12 and an inclined inner surface 15*c*2 substantially parallel with the inner surface 14*c* of the extension end part 14. The end surface 15*e* is a flat surface perpendicular to the first connector 1 in the longitudinal direction. The embedded part 15 is completely covered by the cover part 16, in other words, embedded in the cover part 16.

The above structure can increase the gaps between the end wall inner surface 16*d* and the right and left inclined inner surfaces 15*c*2, thereby allowing an increase in the amount of injected insulating material. Furthermore, since the five surfaces are flat, resin flows on the flat surfaces during insert molding, enhancing moldability and facilitating integration. The five surfaces are not necessarily parallel or flat. For example, the embedded part 15, particularly the portion thereof close to the end, may be a curved surface, such as a column, instead of being substantially a rectangular parallelepiped. The portion corresponding to the inclined inner surface 15*c*2 may have a shape similar to a sphere, including an oval or a cone. As described above, forming recesses, protrusions, curved surfaces, and the like can increase the contact area between the embedded part 15 and the cover part 16, thereby enhancing the strength of integration. As with the embedded part 15, the planes of the outer shape of the cover part 16 are not necessarily parallel or flat. A gap formed between the opposing inner surfaces 15*c* allows resin to smoothly flow through the gap during insert molding, thereby allowing the resin to be easily distributed over the entire surface of the embedded part 15. However, a gap is not necessarily formed. No gap is necessary if the cover part 16 and the embedded part 15 can be smoothly integrated.

In this manner, as the extension end part 14 extends inwardly at an oblique incline and the embedded part 15 is positioned inwardly from the outer surface 12*b* of the first protruding part 12, the width (dimension in the Y-axis direction) of the first protruding end part 18 can be made smaller than the width (distance between the outer surface 12*b* of the left and right first protruding parts 12) of the first connector 1. Note that in the event the width of the first protruding end part 18 does not need to be smaller than the width of the first connector 1, the extension end part 14 does not necessarily have to be inclined obliquely inward, but rather can be extended directly. Furthermore, the extension end part 14 can be omitted by extending the embedded part 15 directly from both ends in the longitudinal direction of the first protruding part 12. In this case, the longitudinal dimension of the first connector 1 can be shortened. Furthermore, when three or more half body parts 10 are arranged in parallel, the extension end part 14 can be extended so as to have a Y-shape from both ends in the longitudinal direction of the first protruding part 12.

The configuration in which the extension end part 14 obliquely extends so as to be inwardly inclined and the embedded part 15 is located inside relative to the outer surface 12*b* of the first protruding part 12, enables the embedded part 15 of the left half body part 10A and the embedded part 15 of the right half body part 10B, or the right and left embedded parts 15, to be located adjacent to each other. The embedded parts 15 arranged adjacent to each other are then integrated by the cover part 16. In comparison to a configuration in which the spacing between the embedded parts 15 is large, the portion between the embedded parts 15 is allowed to have a stable shape without being distorted or warped. The first connector 1 can thus be precisely formed.

The first reinforcement fitting 51 is a member integrally formed by punching, bending, or the like of a metal plate, and includes a substantially rectangular top plate 54 that extends in the width direction of the first housing 11, a substantially rectangular leg part 55 connected to both the left and right edges of the top plate 54 and that extends downwardly, is connected to both the front and rear edges of the top plate 54, and includes the end wall outer cover part 52 and end wall inner cover part 53 that extend downwardly. Note that a tail part 52*a* is connected to the lower end of the end wall outer cover part 52. The width of the end wall outer cover part 52 is larger than the width of the end wall inner cover part 53.

As described above, the first reinforcement fitting 51 is integrated with the cover part 16 so as to configure the first protruding end part 18. The top plate 54 is embedded in the upper surface of the first protruding end part 18. In this state, the upper surface of the top plate 54 is flush with the upper surface of the cover part 16 and constitutes over half the area of the upper surface of the first protruding end part 18. The right and left leg parts 55 are embedded in the right and left outer surfaces of the first protruding end part 18. The outer surface of the leg part 55 is flush with the outer surface of the cover part 16 and constitutes over half the area of the outer surface of the first protruding end part 18. Furthermore, the end wall outer cover part 52 and the end wall inner cover part 53 are embedded in the end wall outer surface and the end wall inner surface of the first protruding end part 18. The respective outer surfaces of the end wall outer cover part 52 and the end wall inner cover part 53 are flush with the end wall outer surface and the end wall inner surface 16*d* of the cover part 16 and constitute over half the area of the end wall outer surface and over half the area of the end wall inner surface of the first protruding end part 18.

The tail part 52*a* is connected to the lower end of the end wall outer cover part 52 at an angle of approximately 90 degrees and extends outward in the longitudinal direction of the first housing 11 and is connected by soldering or the like to a connection pad connected to a conductive trace of the first substrate. Note that the conductive trace is typically a power line. As required, the lower end of the leg part 55 can be arranged close to or in contact with the surface of the first substrate. In this case, the lower end of the leg part 55 is connected by soldering or the like to a connection pad of the first substrate, thereby increasing the strength of connection between the first reinforcement fitting 51 and the first substrate.

A method to produce the first connector 1 configured as above will now be described.

Figure 4:
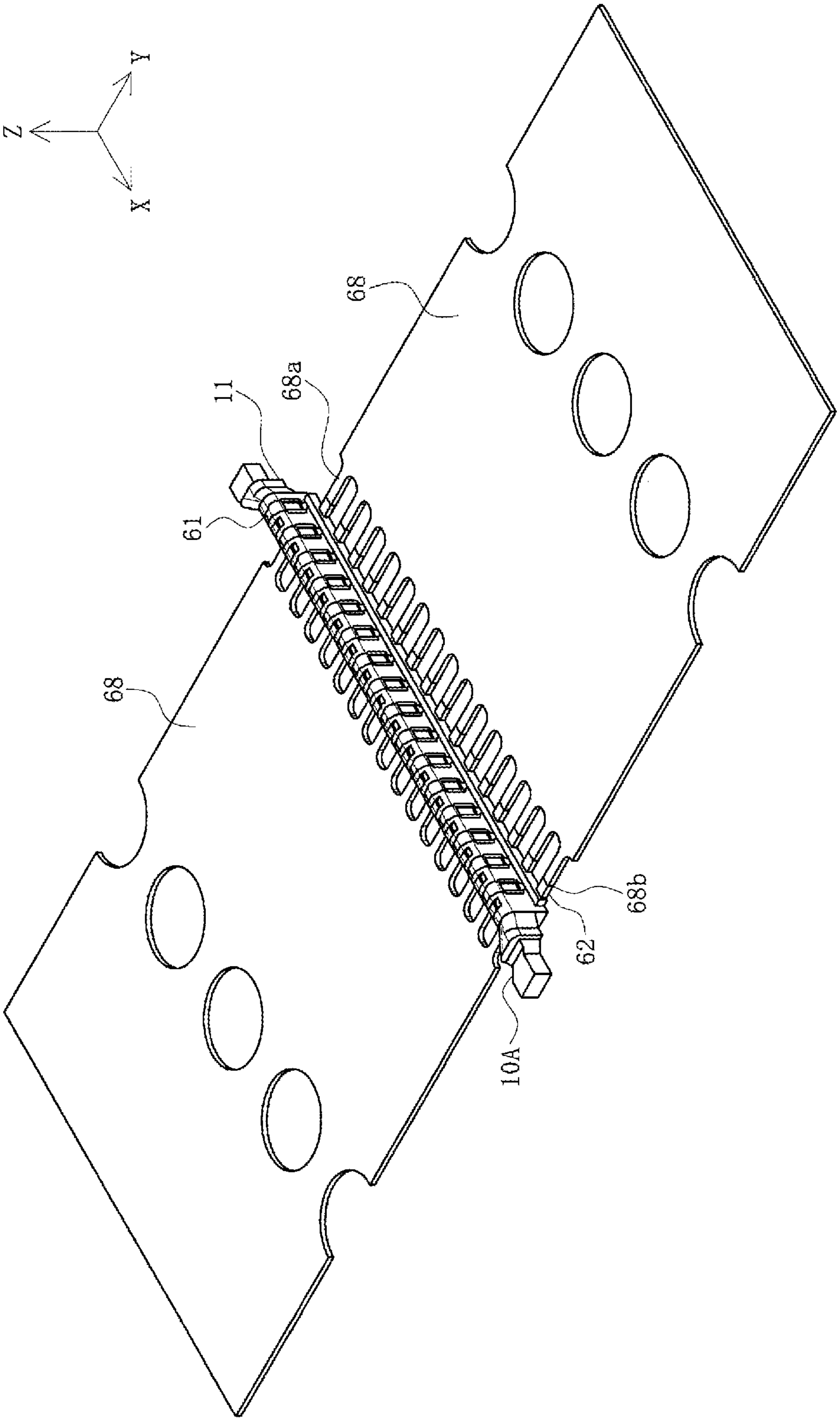
FIG. 4 is a perspective view illustrating a process for producing the left half body part of the first connector according to Embodiment 1.
Figure 5A:
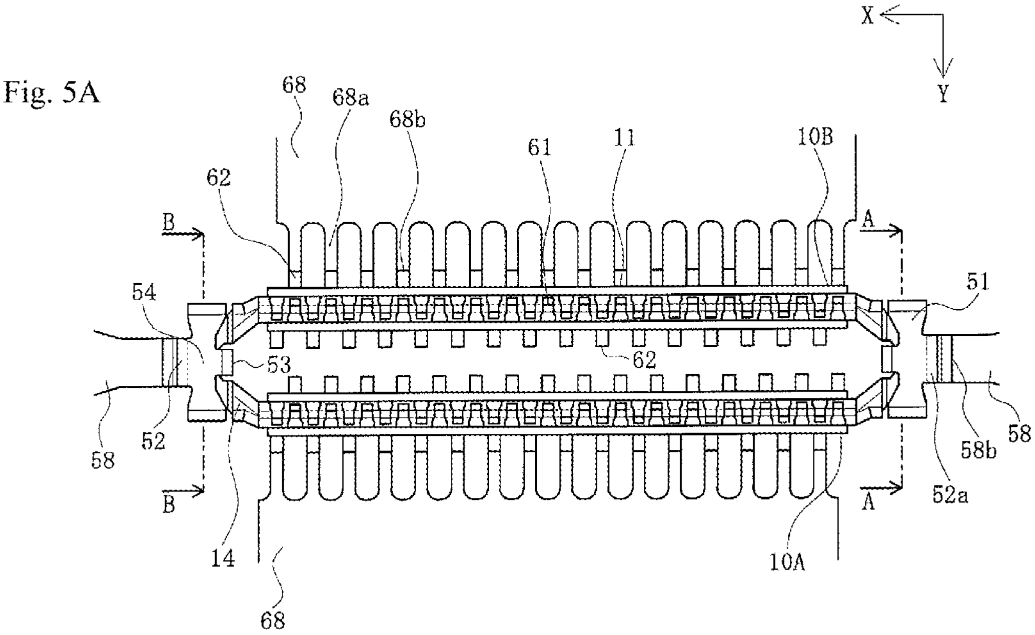
Figure 5B:
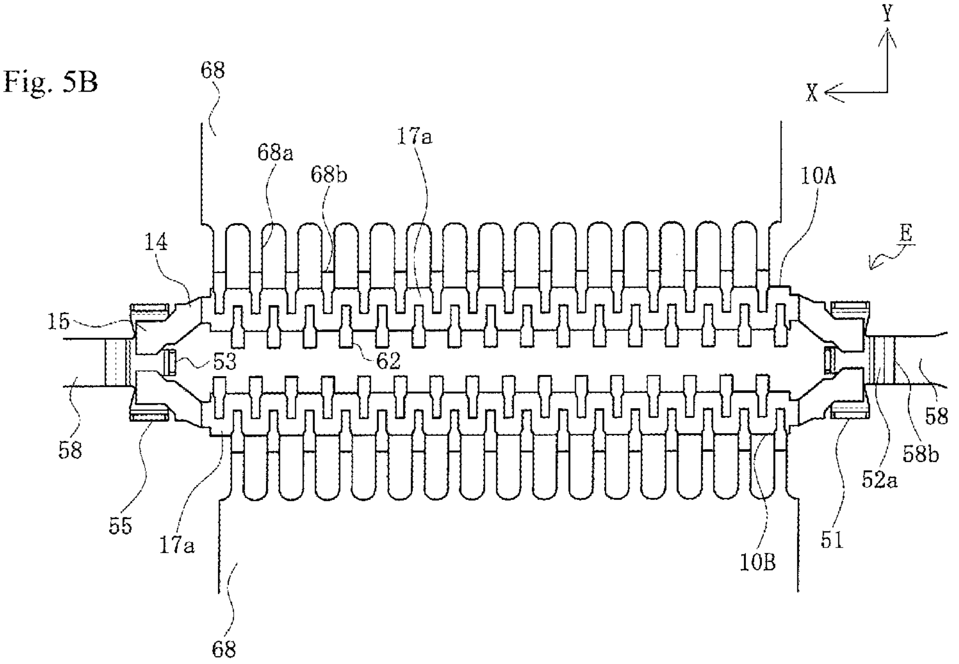
Figure 6A:
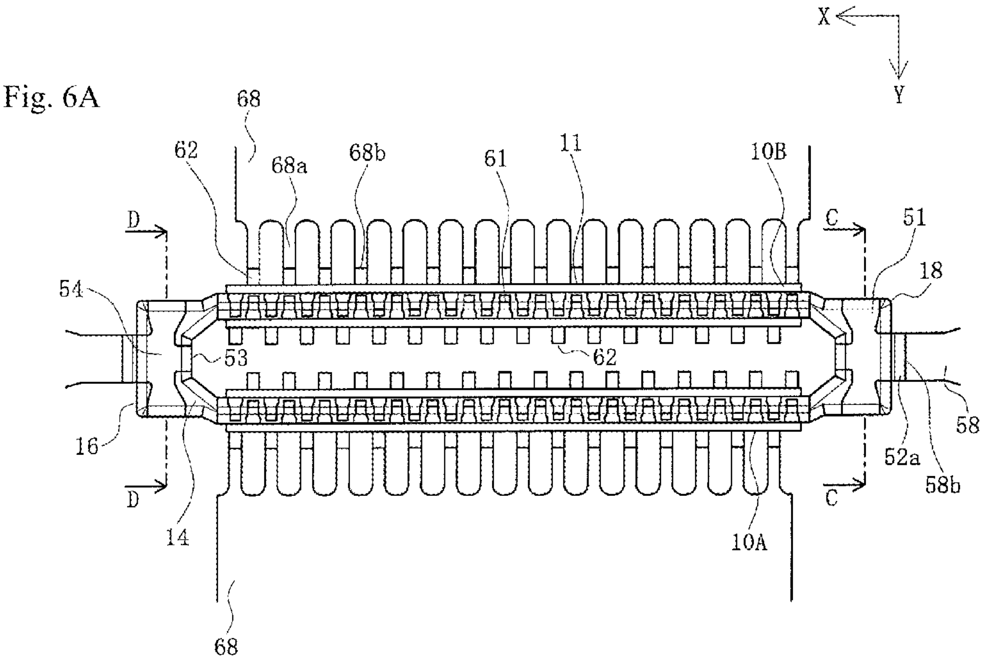
Figure 6B:
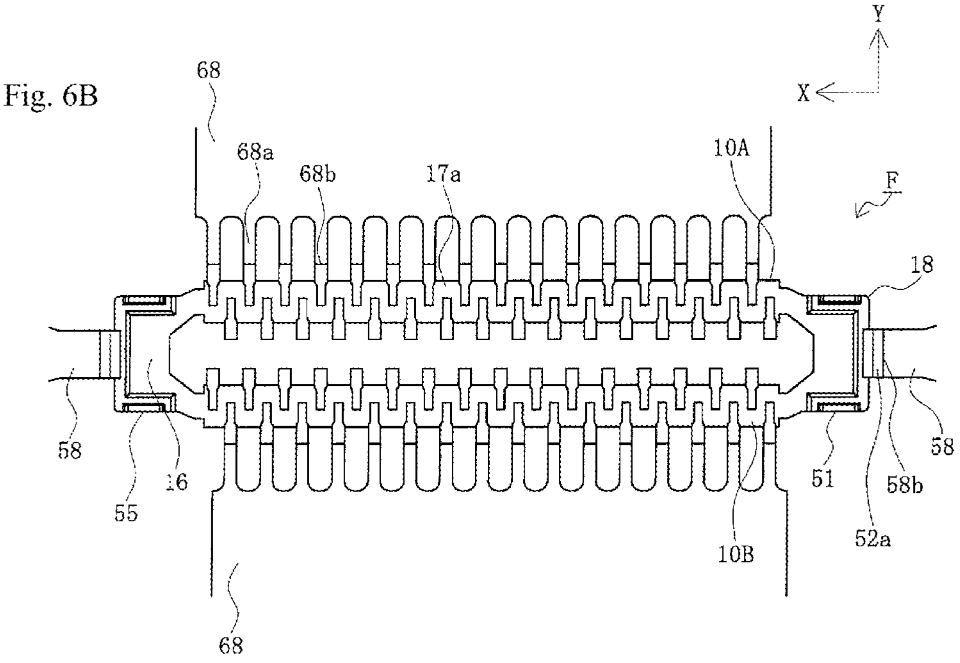
Figure 7A:
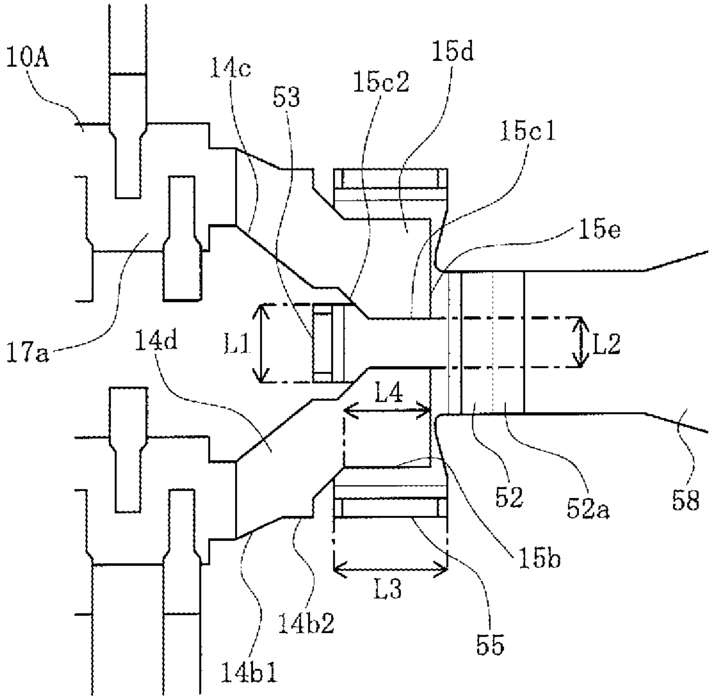
Figure 7B:
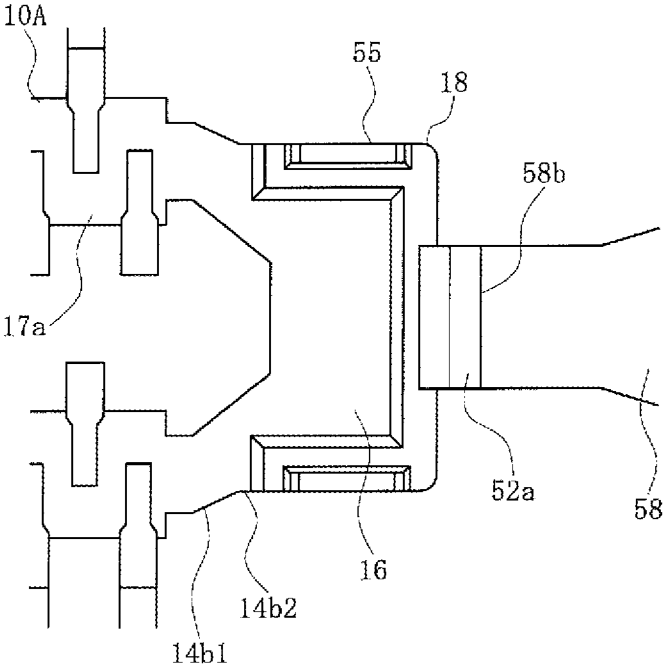
Figure 8A:
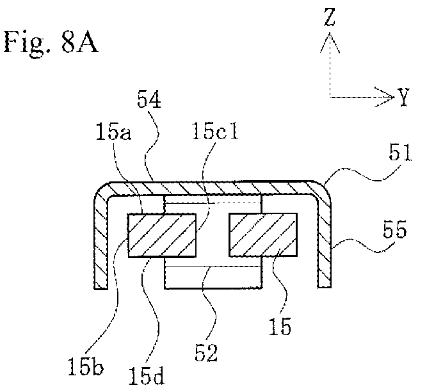
Figure 8B:
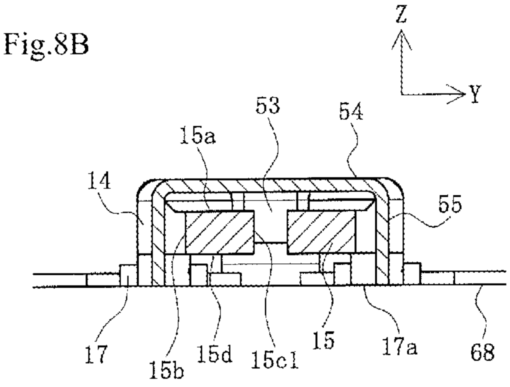
Figure 8C:
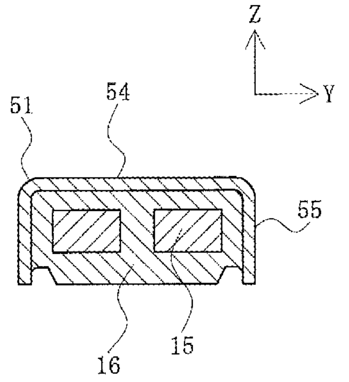
Figure 8D:
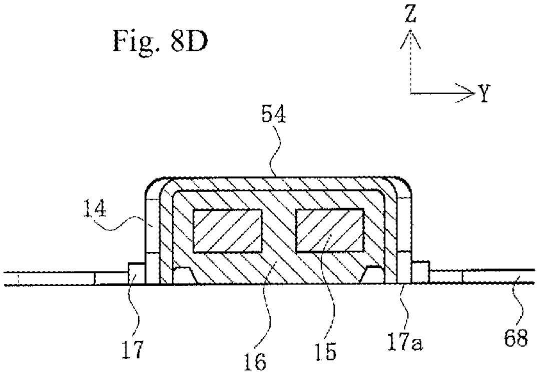

FIG. 4 is a perspective view illustrating the process to produce the left half body part of the first connector according to Embodiment 1. FIGS. 5A-B provide a two view drawing illustrating a first process to produce a first protruding end part of the first connector according to Embodiment 1. FIGS. 6A-B provide a two view drawing illustrating a second process to produce the first protruding end part of the first connector according to Embodiment 1. FIG. 7A-B provide enlarged views illustrating the essential parts of the first and second processes to produce the first protruding end part of the first connector according to Embodiment 1. FIGS. 8A-8D provide cross-sectional drawings illustrating the first and second processes to produce the first protruding end part of the first connector according to Embodiment 1. FIGS. 5A and 6A are top views, while FIGS. 5B and 6B are bottom views. FIG. 7A, is an enlarged view of part E of FIG. 5B, while FIG. 7B is an enlarged view of part F of FIG. 6B. FIG. 8A, is a cross-sectional drawing along arrow A-A of FIG. 5A, FIG. 8B is a cross-sectional drawing along arrow B-B of FIG. 5A, FIG. 8C is a cross-sectional drawing along arrow C-C of FIG. 6A, and FIG. 8D is a cross-sectional drawing along arrow D-D of FIG. 6A.

The first terminal 61 is a metal plate bent in the plate thickness direction and is made by processing, such as punching and bending, a metal plate. As illustrated in FIG. 4, the first terminals 61 are provided connected to a flat board-shape terminal carrier 68 as a carrier. Such a member illustrated in FIG. 2 is obtained by connecting the front ends of the tail parts 62 of the first terminals 61 to the terminal carrier 68 through corresponding long connection arms 68*a*, then cutting off the tail parts 62 from the connection arms 68*a* at the cut parts 68*b*.

For the process to integrate the first terminals 61 with the first housing 11 by insert molding, the first terminals 61 are provided connected to the terminal carrier 68, as illustrated in FIG. 4. FIG. 4 illustrates an example to produce the left half body part 10A. In this example, the first terminals 61 having the tail parts 62 outwardly (the Y-axis positive direction) projecting are connected to the terminal carrier 68 illustrated on the right in FIG. 4, while the first terminals 61 having the tail parts 62 inwardly (the Y-axis negative direction) projecting are connected to the terminal carrier 68 on the left in FIG. 4. In this state, the first terminals 61 are set in the mold (not illustrated) for the first molding. By holding and operating the terminal carriers 68 in connection with a plurality of first terminals 61, the first terminals 61 can be simultaneously positioned and set in the mold for molding.

Subsequently, melted insulating material, such as synthetic resin, is injected into the cavity of the mold for molding. The first insert molding is started in this manner. Any kind of material may be used as the insulating material. In this example, liquid crystal polymer (LCP) is used. A material excellent in flowability is preferably selected for the first insert molding. When the injected insulating material is cooled and solidified so as to form the first housing 11, the mold for molding is opened and the left half body part 10A having the first terminals 61 in connection with the terminal carriers 68, as illustrated in FIG. 4 is removed therefrom. The right half body part 10B having the first terminals 61 in connection with the terminal carriers 68 is produced in the same manner.

Subsequently, of the terminal carriers 68 in connection with the first terminals 61 of the left half body part 10A, as illustrated in FIG. 4, the terminal carrier 68 (the terminal carrier 68 on the left in FIG. 4) in connection with the tail parts 62 inwardly projecting is separated from the left half body part 10A, while the terminal carrier 68 in connection with the tail parts 62 (the terminal carrier 68 on the right in FIG. 4) outwardly projecting is left connected. Likewise, the terminal carriers 68 in connection with the first terminals 61 of the right half body part 10B is separated from the terminal carrier 68 in connection with the tail parts 62 inwardly projecting, while the terminal carrier 68 in connection with the tail part 62 outwardly projecting is left connected.

Subsequently, as illustrated in FIGS. 5A and FIG. 5B, the left half body part 10A and the right half body part 10B having only the outwardly projecting tail parts 62 in connection with the terminal carriers 68 are set opposite each other in a mold (not illustrated) for second molding. More specifically, the right and left half body parts 10 are set such that the insides thereof face each other, the first housings 11 are in parallel with each other, the mounting surfaces 17*a* along with the end surfaces 15*e* located at both ends in the longitudinal direction of the first housings 11 are flush with each other, and the embedded parts 15 are adjacent to but not in contact with each other. Furthermore, as illustrated in FIG. 7A, the opposing right and left half body parts 10 are positioned such that the parallel inner surfaces 15*c*1 of opposing embedded parts 15 are a predetermined distance L2 away from each other and set in the mold for second molding.

Subsequently, the first reinforcement fitting 51 is set in the mold for second molding so as to cover at least part of the extension end parts 14 and the entire embedded parts 15 of the right and left half body parts 10. Specifically, the first reinforcement fitting 51 is set with the front end of the tail part 52*a* connected with a fitting carrier 58 as a carrier. The first reinforcement fitting 51 in the shape illustrated in FIG. 2 is obtained by cutting off the tail part 52*a* from the fitting carrier 58 at a cut part 58*b*. More specifically, as illustrated in FIG. 7A and FIGS. 8A and -8B and other drawings, the first reinforcement fitting 51 is set such that gaps are formed between: the top plate 54 and the upper surface 15*a* of the embedded part 15; the leg part 55 and the outer surface 15*b* of the embedded part 15; the end wall outer cover part 52 and the end surface 15*e* of the embedded part 15; and the end wall inner cover part 53 and the inclined inner surface 15*c*2 of the embedded part 15, such that the lower end of the leg part 55 is located below the lower surface 15*d* of the embedded part 15 while located at substantially the same level as the mounting surface 17*a*.

Subsequently, melted insulating material such as synthetic resin is injected into the cavity of the mold for molding. The second insert molding is started in this manner. The insulating material may be any kind of material. In this example, as with the first insert molding, LCP is used taking flowability into consideration. The insulating material used for the second insert molding may be selected based on the strength and melt bondability with the insulating material of the first insert molding. When the injected insulating material is cooled and solidified so as to form the cover part 16, the mold for molding is opened. The right and left half body parts 10, in which both ends in the longitudinal direction are joined together by the first protruding end parts 18, as illustrated in FIGS. 6A and -6B, are removed from the mold.

In this structure, the right and left half body parts 10 are integrated with the cover part 16 such that at least part of the extension end parts 14 and the entire embedded parts 15 are covered by the cover part 16. The first reinforcement fitting 51 is integrated with the cover part 16 so as to cover at least part of the outer surface of the cover part 16. More specifically, as illustrated in FIG. 7B and FIGS. 8C and -8D and other drawings, the gaps between the top plate 54, the leg part 55, the end wall outer cover part 52, and the end wall inner cover part 53 of the first reinforcement fitting 51 and the upper surface 15*a*, the outer surface 15*b*, the end surface 15*e*, and the inclined inner surface 15*c*2 of the embedded part 15, respectively, are filled with the insulating material of the cover part 16. Similarly, the gap between the parallel inner surfaces 15*c*1 of the opposing embedded parts 15 is filled with the insulating material of the cover part 16. The portion under the lower surface 15*d* of the embedded part 15 is also filled with the insulating material of the cover part 16, such that the lower surface of the cover part 16 is substantially flush with the mounting surface 17*a*. The parallel outer surface 14*b*2 of the extension end part 14 is substantially flush with the outer surface of the cover part 16 and constitutes part of the outer surface of the first protruding end part 18.

As illustrated in FIG. 7A, a gap is formed between the end wall inner cover part 53 of the first reinforcement fitting 51 and each of the inclined inner surfaces 15*c*2 of the embedded parts 15. Moreover, since the inclined inner surface 15*c*2 is inclined, this structure allows the melted insulating material injected into the cavity of the mold for molding during the second insert molding to flow between the end wall inner cover part 53 and the right and left inclined inner surfaces 15*c*2 in addition to flowing between the parallel inner surfaces 15*c*1 of the embedded parts 15 opposite each other. The cavity is thereby completely filled with the material. In addition, a large space formed between the end wall inner cover part 53 and the right and left inclined inner surfaces 15*c*2 allows an increase in the amount of injected insulating material.

As illustrated in FIG. 7A, the width L1 representing the dimension in the width direction of the first connector 1 of the end wall inner cover part 53 of the first reinforcement fitting 51 facing the gap between the parallel inner surfaces 15*c*1 of the embedded parts 15 is preferably larger than the distance L2 representing the gap between the parallel inner surfaces 15*c*1. In other words, it is preferable to satisfy L1>L2. The width of the end wall outer cover part 52 is larger than the width of the end wall inner cover part 53. The boundary between the parallel inner surface 15*c*1 of the embedded part 15, formed by the first insert molding, and the cover part 16, formed by the second insert molding, is covered by the end wall outer cover part 52 and the end wall inner cover part 53 when viewed in the front-rear direction (the X-axis direction). This structure prevents easy separation and enhances the strength of the first protruding end part 18.

As illustrated in FIG. 7A, the dimension, or the length L3, of the leg part 55 of the first reinforcement fitting 51 in the longitudinal direction of the first connector 1 is preferably larger than the length L4 of the outer surface 15*b* of the embedded part 15. In other words, it is preferable to satisfy L3>L4. It is further preferable that, of ends of the outer surface 15*b* in the longitudinal direction of the first connector 1, the end closer to the middle of the first connector 1 be located close to the end in the longitudinal direction of the first connector 1, relative to the end of the leg part 55 closer to the middle in the longitudinal direction of the first connector 1. This structure allows the boundary between the outer surface 15*b* of the embedded part 15, formed by the first insert molding, and the cover part 16, formed by the second insert molding, to be covered by the leg part 55 when viewed in the width direction (the Y-axis direction). This structure prevents easy separation and enhances the strength of the first protruding end part 18.

Furthermore, the embedded part 15 is disposed so as to at least partially overlap any of the top plate 54, the end wall outer cover part 52, the end wall inner cover part 53, and the leg part 55 of the first reinforcement fitting 51 when viewed in the height direction, the front-rear direction (the longitudinal direction), and the right-left direction (the width direction). This structure enhances the strength of the first protruding end part 18.

In the final step, the remaining terminal carriers 68 and the fitting carriers 58 are cut off from the right and left half body parts 10 having both ends in the longitudinal direction joined together by the first protruding end parts 18, as illustrated in FIGS. 6A and -6B. Consequently, the first connector 1 as illustrated in FIG. 1 is obtained.

The configuration of the second connector 101 constituting a connector pair along with the first connector 1 will now be described, along with the operation to mate the first connector 1 and the second connector 101.

Figure 9:
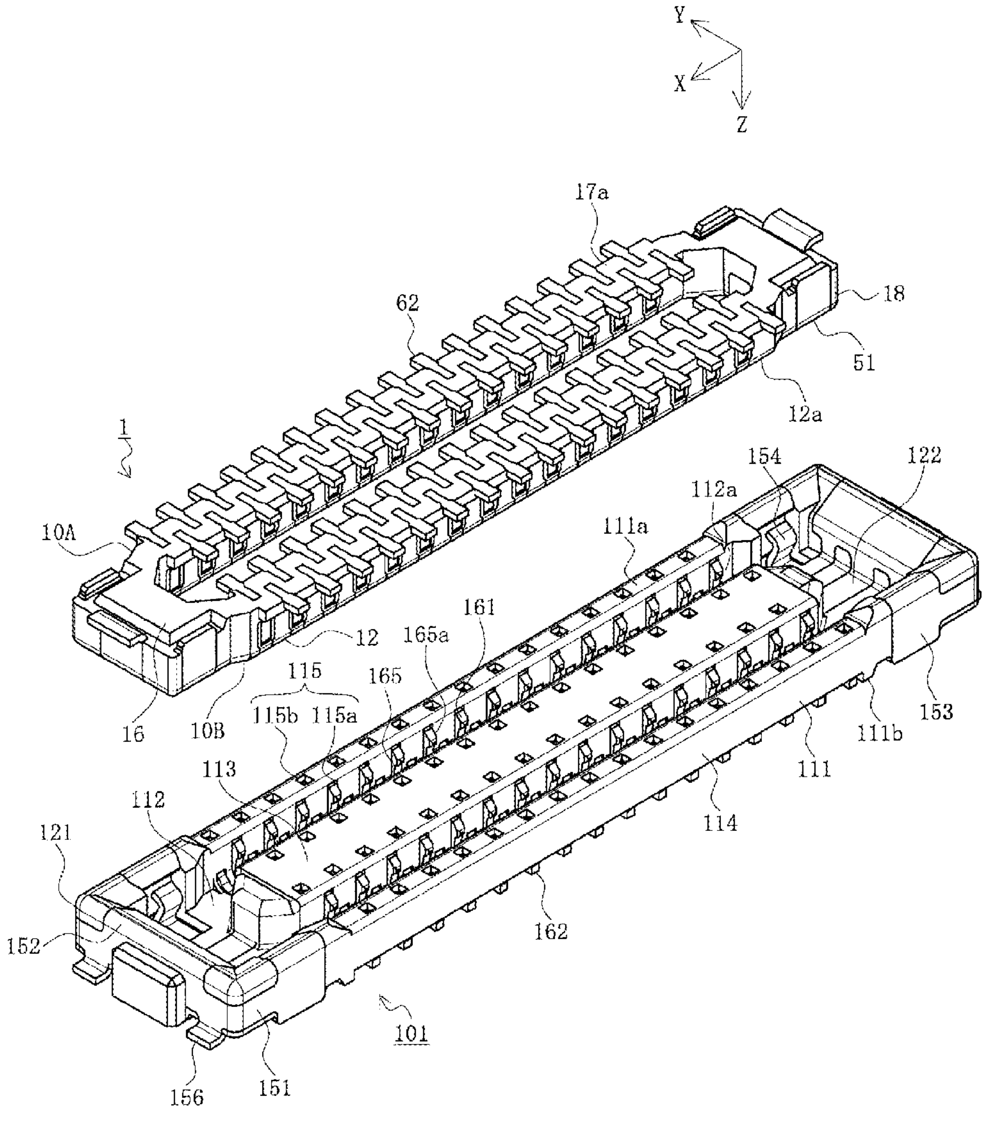
FIG. 9 is a perspective view viewed from the first connector to illustrate the state immediately prior to mating of the first connector and a second connector according to Embodiment 1.

FIG. 9 is a perspective view viewed from the first connector to illustrate the state immediately prior to mating of the first connector and the second connector according to Embodiment 1.

The second connector 101, as a counterpart connector according to the present embodiment, has a second housing 111 as a counterpart connector body integrally formed of an insulating material such as synthetic resin. As illustrated in the figure, the second housing 111 has a substantially rectangular thick plate-like shape that is a substantially rectangular parallelepiped. Furthermore, the side of the second housing 111 into which the first connector 1 is inserted, in other words, the side of the mating surface 111*a* (Z-axis negative direction), is a substantially rectangular recessed part 112 with an enclosing periphery, forming the recessed part 112 to be mated with the first housing 11. Inside the recessed part 112 is the second protruding part 113, as an insular part to be mated with a recessed groove part 13, that is integrally formed with the second housing 111; moreover, side wall parts 114 extending in parallel with the second protruding part 113 on both sides of the second protruding part 113 are integrally formed with the second housing 111.

The second protruding part 113 and the side wall parts 114 protrude upwardly (Z-axis negative direction) from the bottom surface of the recessed part 112 and extend in the longitudinal direction of the second connector 101. Consequently, a recessed groove part 112*a* that is an elongated recessed part extending in the longitudinal direction (X-axis direction) of the second connector 101 is formed as part of the recessed part 112 on both the sides of the second protruding part 113.

Second terminal stowing groove-shape cavities 115*a* in the shape of a recessed groove are formed on both side surfaces of the second protruding part 113 and on the inner side surfaces of the side wall parts 114 in order to stow the second terminals 161. Second terminal stowing hole-shape cavities 115*b* in the shape of a hole are formed on the second protruding part 113 and on the side wall parts 114 in order to stow the second terminals 161. The second terminal stowing groove-shape cavity 115*a* and the second terminal stowing hole-shape cavity 115*b* are connected and integrated with each other on the bottom surface of the recessed groove part 112*a*. The second terminal stowing groove-shape cavity 115*a* and the second terminal stowing hole-shape cavity 115*b* are therefore described as a second terminal stowing cavity 115 when collectively described. The second terminal stowing cavities 115 are disposed at a pitch corresponding to the first terminals 61 and at the corresponding appropriate number.

The second terminal 161 is a member integrally formed by applying a process such as punching or the like to a conductive metal plate and consists of a main body part, a tail part 162 connected to the bottom end of the main body part, a connecting part that extends in the width direction (Y-axis direction) of the second connector 101 from close to the bottom end of the main body part, and a contact part 165 that extends upwards (Z-axis positive direction) from the connecting part. Note that a contact protruding part 165*a* that protrudes towards the main body part is preferably formed near the tip of the contact part 165.

The main body part is a part that is press-fit and retained in the second terminal stowing hole-shape cavity 115*b*. In addition, the tail part 162 is bent connected to the lower end of the main body part, extends in the width direction of the second housing 111, and is connected by soldering or the like to a connection pad connected with the conductive trace of the second substrate. The conductive trace is typically a signal line. The contact part 165 contacts the first terminal 61 of the first connector 1 in the event the first connector 1 and the second connector 101 mate. Preferably, the contact protruding part 165*a* engages with the contact recessed part 65*a* formed on the contact part 65 of the first terminal 61.

The second terminal 161 is inserted into the second terminal stowing cavity 115 from the lower part of the second housing 111 and mounted in the second housing 111. In this manner, the main body part of the second terminal 161 is press-fit into the second terminal stowing hole-shape cavity 115*b* and retained, whereas the contact part 165 is stowed in the second terminal stowing groove-shape cavity 115*a* so as to be exposed to the recessed groove part 112*a*. The lower surface of the tail part 162 is exposed to a mounting surface 111*b* serving as the lower surface of the second housing 111.

In addition, similar to the first terminal 61, the second terminals 161 mounted in each of the recessed groove parts 112*a* are oriented such that the posture of those that are adjacent will face opposing directions in regard to the width direction of the recessed groove part 112*a*. In the example illustrated in FIG. 9, of the second terminals 161 mounted in the recessed groove part 112*a* on the side in the Y-axis positive direction, the second terminal 161 positioned at the front end (end in the X-axis positive direction) is oriented such that the tail part 162 protrudes in the Y-axis negative direction, while the second terminal 161 positioned second from the front end is oriented such that the tail part 162 protrudes in the Y-axis positive direction. In this manner, as the second terminals 161 are mounted in the recessed groove part 112*a* arranged in a line in alternating directions, the pitch of the tail parts 162 exposed on the mounting surface 111*b* on both sides of the recessed groove part 112*a* is set to twice the pitch of the second terminals 161. This configuration facilitates the operation to connect the second terminal 161 to the connection pad of the second substrate by soldering or the like. In addition, the pitch of the contact part 165 exposed to the recessed groove part 112*a* is set to twice the pitch of the second terminals 161.

In addition, second protruding end parts 121 are disposed as mating guide parts on both ends in the longitudinal direction of the second housing 111. The mating recessed part 122 is formed as part of the recessed part 112 in each second protrusion end part 121. The mating recessed part 122 is a substantially rectangular recess and is connected to both ends in the longitudinal direction of each recessed groove part 112*a*. Moreover, in a state in which the first connector 1 and the second connector 101 are mated inside the mating recessed part 122, the first protruding end part 18 provided on the first connector 1 is inserted. A second reinforcement fitting 151 as a counterpart reinforcement fitting is attached to the second protruding end part 121 The second reinforcement fitting 151 is integrated with the second housing 111 by means of insert molding.

The second reinforcement fitting 151 is a member integrally formed by punching, bending, or the like of a metal plate and has a second main body part 152 extending in the width direction of the second housing 111, a lateral cover part 153 connected to both the left and right ends of the second main body part 152, a contact side part 154 disposed on the left and right inner walls of the mating recessed part 122, and a tail part 156 connected to the lower end of the second main body part 152. The tail part 156 extends toward the outside in the longitudinal direction of the second connector 101 and is connected by soldering or the like to the connection pad (not illustrated) exposed on the surface of the second substrate. Note that, for example, the connection pad is preferably coupled with the conductive trace, which is a power line.

Subsequently, the operation of mating together the first connector 1 and the second connector 101 with the above configuration will be described.

The first connector 1 is mounted on the surface of the first substrate with the tail parts 62 of the first terminals 61 connected by soldering or the like to a connection pad (not illustrated) connected with a conductive trace of the first substrate, with the tail part 52*a* of the first reinforcement fitting 51 connected by soldering or the like to a connection pad connected with a conductive trace of the first substrate. Note that the conductive trace connected to the connection pad to which the tail part 62 of the first terminal 61 is connected is a signal line, while the conductive trace connected to the connection pad to which the tail part 52*a* of the first reinforcement fitting 51 is connected is a power line.

Similarly, the second connector 101 is mounted on the surface of the second substrate with the tail parts 162 of the second terminals 161 connected by soldering or the like to a connection pad (not illustrated) connected with a conductive trace of the second substrate, with the tail part 156 of the second reinforcement fitting 151 connected by soldering or the like to a connection pad connected with a conductive trace of the second substrate. Note that the conductive trace connected to the connection pad to which the tail part 162 of the second terminal 161 is connected is a signal line, while the conductive trace connected to the connection pad to which the tail part 156 of the second reinforcement fitting 151 is connected is a power line.

First, an operator opposes the mating surface 12*a* of the first protruding part 12 as the mating surface of the first housing 11 of the first connector 1 and the mating surface 111*a* of the second housing 111 of the second connector 101, such that when the position of the first protruding part 12 of the first connector 1 is aligned with the position of the corresponding recessed groove part 112*a* of the second connector 101 and when the position of the first protruding end part 18 of the first connector 1 aligns with the position of the corresponding mating recessed part 122 of the second connector 101, position alignment of the first connector 1 and the second connector 101 is complete.

In this state, when the first connector 1 and/or the second connector 101 are moved in a direction approaching the other connector, in other words, in the mating direction, the first protruding part 12 and the first protruding end part 18 of the first connector 1 are inserted into the recessed groove part 112*a* and the mating recessed part 122 of the second connector 101. With this process, mating of the first connector 1 and the second connector 101 is completed. Furthermore, the first terminals 61 and the second terminals 161 are placed in a conductive state.

A modification of the first connector 1 will now be described.

Figure 10:
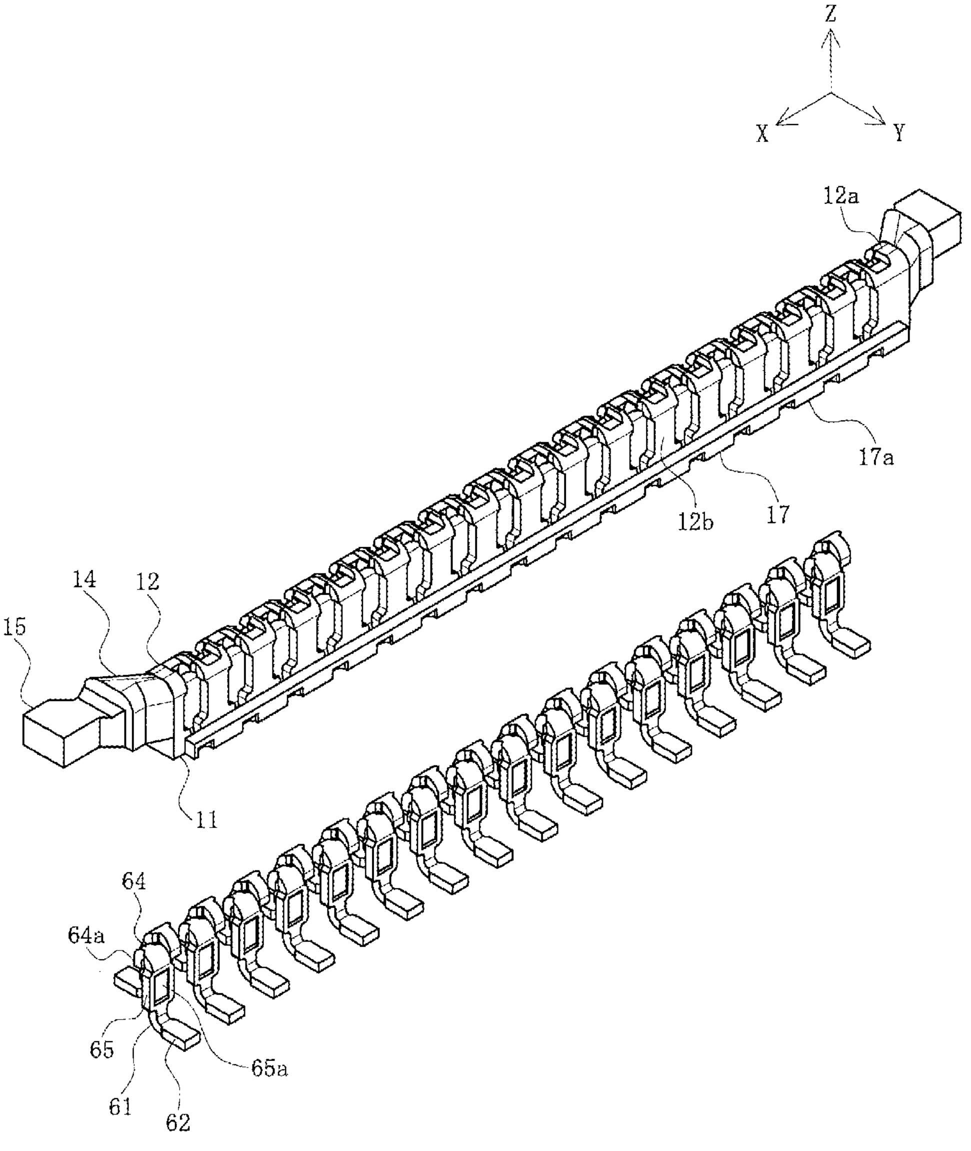
FIG. 10 is an exploded view of the left half body part of the first connector in a modification of Embodiment 1.

FIG. 10 is an exploded view of the left half body part of the first connector in a modification of Embodiment 1.

In the modification illustrated in the drawings, the first terminal 61 includes no main body part 63 but includes a contact part 65 extending in the height direction, a tail part 62 connected to the lower end of the contact part 65 at an angle of approximately 90 degrees, and an upper end part 64 connected to the upper end of the contact part 65 at an angle of approximately 90 degrees. Note that an embedded part 64*a* extending in the downward direction bent at approximately 90 degrees is connected to the tip end of the upper end part 64. The embedded part 64*a* is a part that is embedded in the first protruding part 12 in the downward direction from the mating surface 12*a*.

The tail part 62 of the first terminal 61, illustrated in FIG. 2 and others, extends in the direction opposite the direction in which the contact part 65 faces, whereas the tail part 62 of the first terminal 61 of the modification illustrated in FIG. 10 extends in the same direction as the direction in which the contact part 65 faces. This structure facilitates the operation to set the first terminals 61 in the mold for the first molding from the right and left sides, holding the terminal carrier 68 connected with the front ends of the tail parts 62 through the long connection arms 68*a*, such that the first terminals 61 are oriented in alternately opposing directions.

Since the configuration, operation, and effects of other components of the first terminal 61 in the modification illustrated in FIG. 10 are the same as those of the first terminal 61 illustrated in FIG. 2 and other drawings, a description thereof will be omitted.

In this embodiment, the first connector 1 includes the half body parts 10, each of which includes the first housing 11 and a plurality of first terminals 61 mounted on the first housing 11, the first protruding end part 18 formed on both ends of the first housing 11 with the first housings 11 of the half body parts 10 abutting each other, and the first reinforcement fitting 51 attached to the first protruding end part 18. Each of the first housings 11 is a member integrated with the first terminals 61 by the first insert molding. The first housing 11 includes the first protruding part 12 extending in the longitudinal direction of the first housing 11 and holding the first terminals 61, the extension end part 14 connected to each end in the longitudinal direction of the first protruding part 12, and the embedded part 15 extending from the extension end part 14. The first protruding end part 18 includes the cover part 16 that covers at least part of the extension end part 14 and the entire embedded parts 15 of each of the first housings 11. The cover part 16 is a member integrated with the extension end part 14, the embedded part 15, and the first reinforcement fitting 51 by the second insert molding.

This configuration achieves narrower spacing between the first protruding parts 12 of the first housing 11 to which a plurality of first terminals 61 are mounted, thereby making the first connector 1 more compact. In addition to this, the configuration facilitates the production of the first connector 1 while enhancing the reliability of the first connector 1.

The first reinforcement fitting 51 includes a top plate 54 that extends in the width direction of the first housing 11, a right and left pair of leg parts 55 connected to the right and left edges of the top plate 54 and extending downward, and an end wall outer cover part 52 as well as an end wall inner cover part 53 connected to the front and rear edges of the top plate 54 and extending downward. The embedded part 15 is arranged such that at least part thereof overlaps the top plate 54, the leg parts 55, the end wall outer cover part 52, and the end wall inner cover part 53 when viewed from the top, bottom, front, rear, right, and left. This structure allows the embedded part 15 of the left half body part 10A and the embedded part 15 of the right half body part 10B to be firmly joined together by the cover part 16 integrated with the first reinforcement fitting 51, thereby achieving the precise formation of the first protruding end part 18 and tight connection between the left half body part 10A and the right half body part 10B.

The embedded part 15 of the first housing 11 includes the parallel inner surface 15*c*1 extending in the longitudinal direction of the first housing 11 and opposite the embedded part 15 of the other first housing 11. The distance L2 between the opposing parallel inner surfaces 15*c*1 is smaller than the width L1 of the end wall inner cover part 53 of the first reinforcement fitting 51 facing the gap formed between the opposing parallel inner surfaces 15*c*1. With this structure, the boundary between the parallel inner surface 15*c*1 of the embedded part 15 formed by the first insert molding and the cover part 16 formed by the second insert molding overlaps the end wall inner cover part 53 when viewed in the front-rear direction. This prevents easy separation and enhances the strength of the first protruding end part 18.

The end wall inner cover part 53 is opposite the inclined inner surfaces 15*c*2 of the embedded parts 15 that are connected to the respective parallel inner surfaces 15*c*1 opposite each other and are inclined with respect to the longitudinal direction of the first housing 11. In addition, the end wall inner cover part 53 is arranged so as to form a space along with the inclined inner surfaces 15*c*2.

The embedded part 15 of the first housing 11 includes the outer surface 15*b* extending in the longitudinal direction of the first housing 11 and facing the leg part 55 of the first reinforcement fitting 51. The length L4 of the outer surface 15*b* is smaller than the length L3 of the leg part 55. This structure allows the boundary between the outer surface 15*b* of the embedded part 15 formed by the first insert molding and the cover part 16 formed by the second insert molding to be covered by the leg part 55 when viewed in the right-left direction, thereby preventing easy separation and enhancing the strength of the first protruding end part 18.

The extension end parts 14 of the first housing 11 extend from both ends in the longitudinal direction of the first protruding part 12, while being inwardly inclined in the width direction of the first connector 1. The width of the first protruding end part 18 is smaller than the width of the first connector 1. Since the first protruding end part 18 has a smaller width than the width of the first connector 1, in the event the first connector 1 and the second connector 101 mate, this structure enables the first protruding end part 18 to fit in the mating recessed part 122 of the second housing 111, which actually has a small inner width due to the contact side parts 154 formed on the right and left inner walls of the mating recessed part 122.

Next, Embodiment 2 will be described below. Note that, for portions having the same structure as that of Embodiment 1, descriptions thereof are omitted by giving the same reference numerals thereto. Moreover, descriptions of the same operations and effects as those of Embodiment 1 will be omitted.

Figure 11:
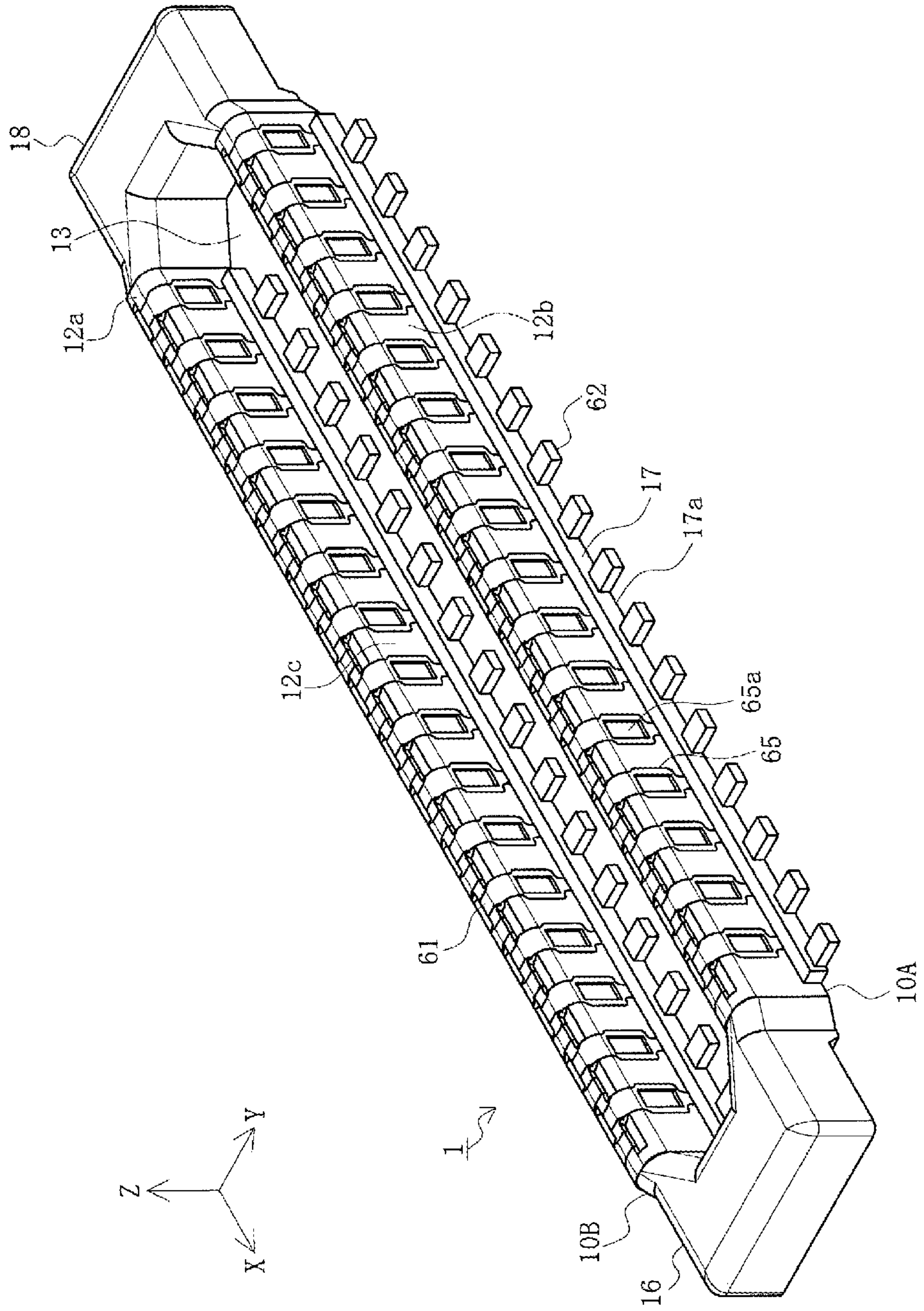
FIG. 11 is a perspective view of the first connector according to Embodiment 2.
Figure 12:
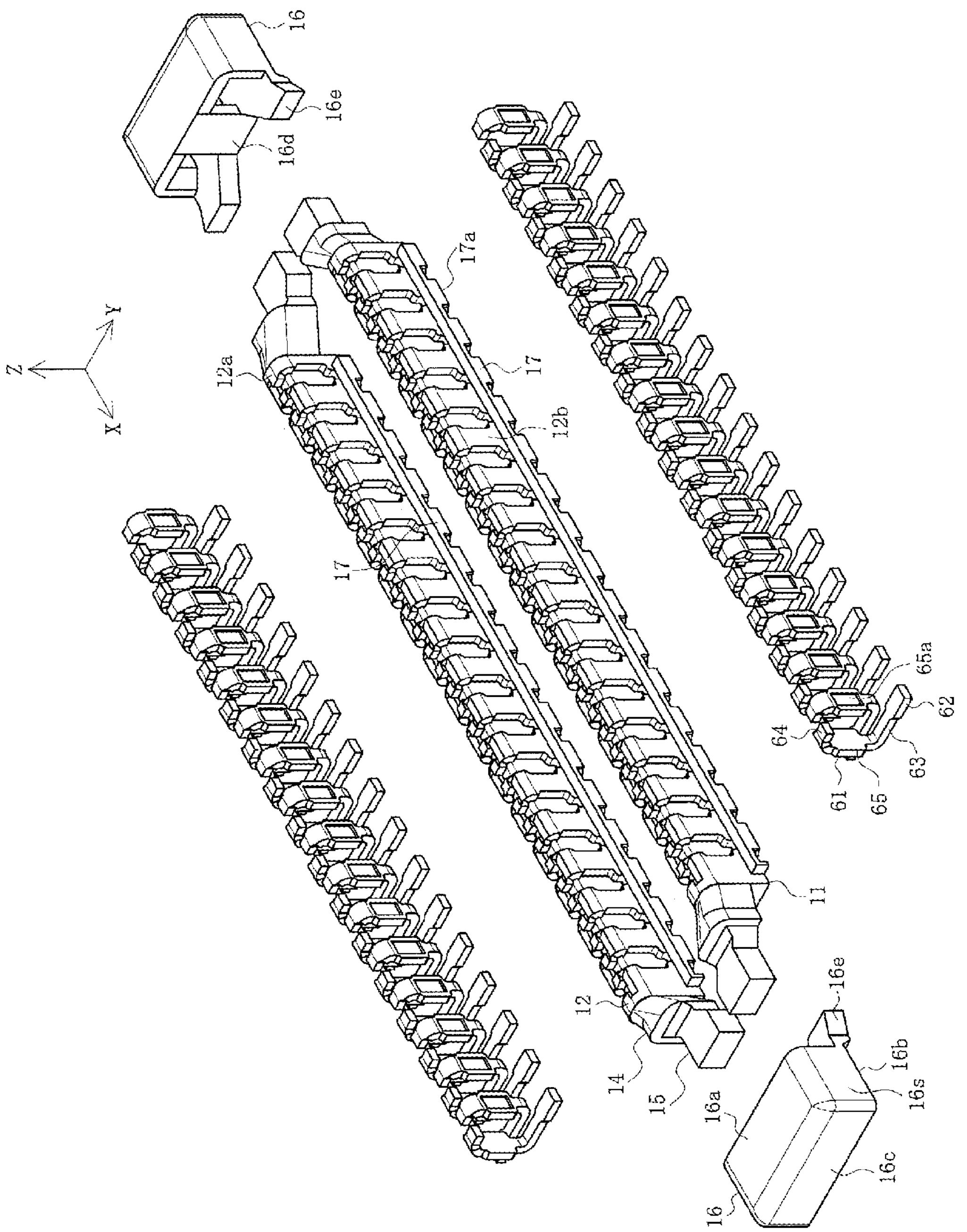
FIG. 12 is an exploded view illustrating the first connector according to Embodiment 2.
Figure 14A:
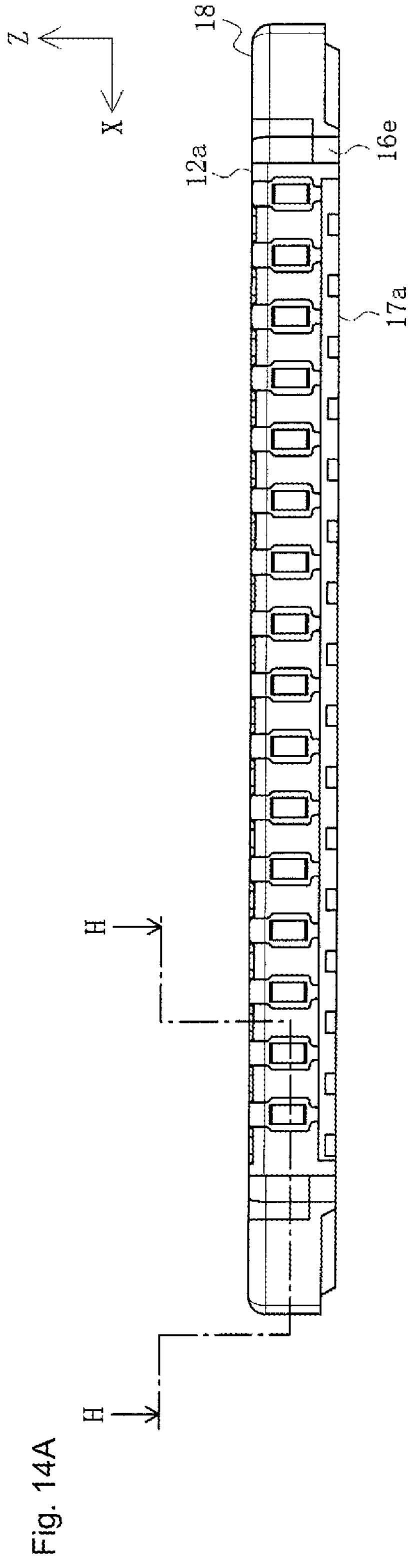
Figure 14B:
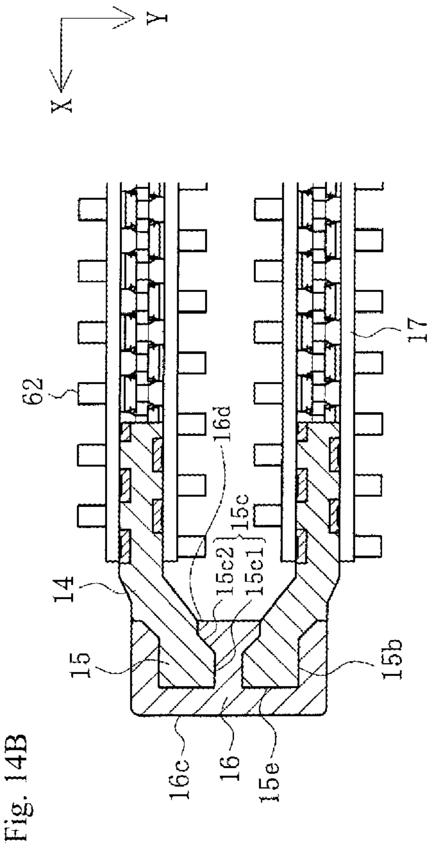
Figure 15:
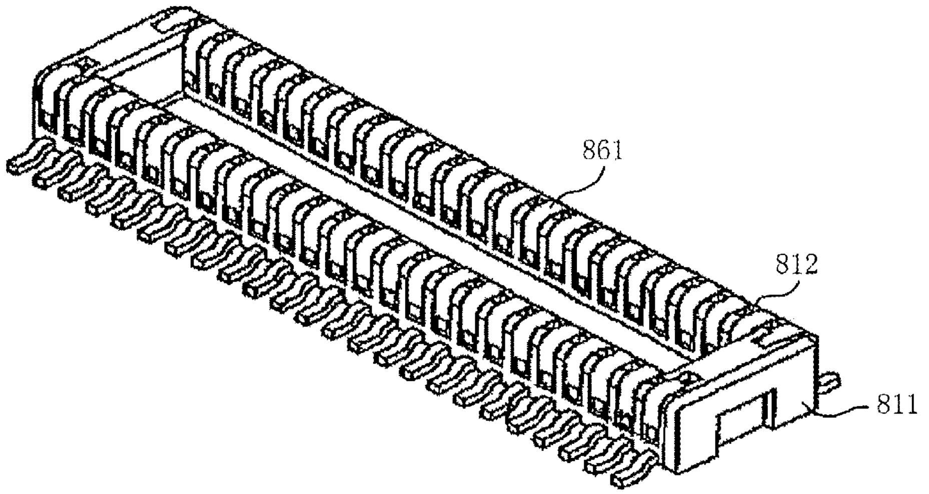
FIG. 15 is a perspective view illustrating a conventional connector.

FIG. 11 is a perspective view of a first connector according to Embodiment 2. FIG. 12 is an exploded view of the first connector according to Embodiment 2. FIGS. 13A and -13B provide a first two view drawing illustrating a first protruding end part of the first connector according to Embodiment 2. FIGS. 14A and -14B provide a second two view drawing illustrating the first protruding end part of the first connector according to Embodiment 2. In FIGS. 13A and -13B, FIG. 13A is a bottom view, while FIG. 13B is a cross-sectional drawing along arrow G-G of FIG. 13A. In FIGS. 14A and -14B, FIG. 14A is a side view, while FIG. 14B is a cross-sectional drawing along arrow H-H of FIG. 14A.

In this embodiment, the first reinforcement fitting 51 is omitted. The cover part 16 of this embodiment is not covered by the first reinforcement fitting 51, while the cover part 16 of Embodiment 1 is covered by the first reinforcement fitting 51.

In this embodiment, as with Embodiment 1, at least part of the extension end part 14 and the entire embedded part 15 of each of the right and left half body parts 10 are covered by the cover part 16 made of an insulating material, such as synthetic resin. The cover part 16 is formed by the second insert molding performed with the embedded parts 15 of the right and left half body parts 10 arranged adjacent to each other. With this process, the first protruding end part 18, in which the extension end parts 14 and the embedded parts 15 of the right and left half body parts 10 and the cover part 16 are integrated, is formed, thereby joining the right and left half body parts 10 are together.

The cover part 16 includes the upper surface 16*a* located at the top, the lower surface 16*b* located at the bottom, the right and left side surfaces 16*s*, the outer end surface 16*c* facing outside at the end in the longitudinal direction of the first connector 1, and the end wall inner surface 16*d* oriented toward the middle in the longitudinal direction of the first connector 1. Furthermore, the embedded part 15 is disposed so as to overlap any of the upper surface 16*a*, the lower surface 16*b*, the side surfaces 16*s*, the outer end surface 16*c*, and the end wall inner surface 16*d* of the cover part 16, when viewed in the height direction, the front-rear direction (the longitudinal direction), and the right-left direction (the width direction). This structure enhances the strength of the first protruding end part 18.

The extension end part 14 of this embodiment has the same structure as that of Embodiment 1, with at least part of the lower surface 14*d* covered by the cover part 16. The embedded part 15 has the same structure as that of Embodiment 1 with the five surfaces thereof, including the upper surface 15*a*, the outer surface 15*b* and the inner surface 15*c* on the right and left sides, the lower surface 15*d* located at the bottom, and the end surface 15*e* at the end in the longitudinal direction of the first connector 1, covered by the cover part 16. In other words, the embedded part 15 is embedded in the cover part 16. The gap between the inclined inner surfaces 15*c*2 of the opposing inner surfaces 15*c* becomes larger toward the middle in the longitudinal direction of the first connector 1. The above structure can increase the gaps between the end wall inner surface 16*d* and the right and left inclined inner surfaces 15*c*2, allowing an increase in the amount of injected insulating material. Furthermore, since the five surfaces are flat, resin flows on the flat surfaces during insert molding, enhancing moldability and facilitating integration. The five surfaces are not necessarily parallel or flat. For example, the embedded part 15, particularly the portion thereof close to the end, may be a curved surface, such as a column, instead of being a substantially rectangular parallelepiped. The portion corresponding to the inclined inner surface 15*c*2 may have a shape similar to a sphere, including an oval or a cone. As described above, forming recesses, protrusions, curved surfaces, and the like can increase the contact area between the embedded part 15 and the cover part 16, thereby enhancing the strength of integration. As with the embedded part 15, the planes of the outer shape of the cover part 16 are not necessarily parallel or flat.

A gap formed between the opposing inner surfaces 15*c* allows resin to smoothly flow through the gap during insert molding, thereby allowing the resin to be easily distributed over the entire surface of the embedded part 15. However, a gap is not necessarily formed. No gap is necessary if the cover part 16 and the embedded part 15 can be smoothly integrated.

The cover part 16 includes extended cover parts 16*e* extended so as to be integrated with the lower surfaces 14*d* of the extension end parts 14. The extended cover part 16*e* can increase the contact area between the cover part 16 and the first housing 11, further enhancing the strength of integration. Although preferable, the lower surface of the extended cover part 16*e* is not necessarily flush with the mounting surface 17*a*. Formation of the lower surface of the extended cover part 16*e* that is flush with the mounting surface 17*a* can increase the mounting surface of the first connector 1 to the first substrate, which is beneficial in terms of stabilizing the mounting state.

The configuration, in which the extension end part 14 obliquely extends so as to be inwardly inclined and the embedded part 15 is located inside relative to the outer surface 12*b* of the first protruding part 12, enables the embedded part 15 of the left half body part 10A and the embedded part 15 of the right half body part 10B, or the right and left embedded parts 15, to be located adjacent to each other. The embedded parts 15 arranged adjacent to each other are then integrated by the cover part 16. In comparison with a configuration in which the spacing between the embedded parts 15 is large, the portion between the embedded parts 15 is allowed to have a stable shape without being distorted or warped. The first connector 1 can thus be precisely formed. Since the embedded part 15 is eccentric with respect to the extension end part 14, the embedded part 15 is capable of being formed in a fashion such that it sticks out toward the inside of the extension end part 14. This manner of formation allows the inside of the embedded part 15 closer to the first protruding part 12 to be covered by resin with which the end wall inner surface 16*d* of the cover part 16 is formed. The strength of integration is therefore further enhanced.

As with Embodiment 1, the cover part 16 does not necessarily cover the entire embedded part 15, but may cover the embedded part 15 to a degree sufficient to join the right and left half body parts 10. However, the entire embedded part 15 is preferably covered in order to increase the binding strength to the highest degree.

The cover part 16 is a member formed so as to be integrated with other members by insert molding and is not an independent member separate from other members. It should, however, be noted that, for convenience of illustration, the cover part 16 in FIG. 12 is depicted as if it were an independent member.

Since configurations and methods of the production of other components of the first connector 1, the configuration of the second connector 101, and the method of mating of the first connector 1 and the second connector 101 of this embodiment are the same as those described in Embodiment 1, a description thereof will be omitted.

In this embodiment, the first connector 1 includes the half body parts 10, each of which includes the first housing 11 and a plurality of first terminals 61 mounted on the first housing 11, along with the first protruding end parts 18 formed on respective ends of the first housing 11 with the first housings 11 of the half body parts 10 abutting each other. Each of the first housings 11 is a member integrated with the first terminals 61 by the first insert molding. The first housing 11 includes the first protruding part 12 extending in the longitudinal direction of the first housing 11 and holding the first terminals 61, along with the embedded part 15 connected to each end in the longitudinal direction of the first protruding part 12. The first protruding end part 18 includes the cover part 16 that covers the entire embedded part 15 of each of the first housings 11. The cover part 16 is a member integrated with the embedded part 15 by the second insert molding.

This configuration achieves narrower spacing between the first protruding parts 12 of the first housings 11 to which a plurality of first terminals 61 are mounted, thereby making the first connector 1 more compact. In addition to this, the configuration facilitates the production of the first connector 1 while enhancing the reliability of the first connector 1.

The extension end part 14 is connected to each end in the longitudinal direction of the first protruding part 12, while the embedded part 15 extends from the extension end part 14. The embedded part 15 of the first housing 11 includes the inner surface 15*c* extending in the longitudinal direction of the first housing 11 and opposite the embedded part 15 of the other first housing 11. The gap between the inner surfaces 15*c* opposite each other is filled with a molding material of the cover part 16. The cover part 16 further includes the end wall inner surface 16*d* oriented toward the middle in the longitudinal direction of the first housing 11. The end wall inner surface 16*d* is opposite the inclined inner surface 15*c*2 of the embedded part 15 that is included in the opposing inner surface 15*c* and inclined relative to the longitudinal direction of the first housing 11. The inclined inner surface 15*c*2 is covered by a molding material of the cover part 16. The cover part 16 further includes the right and left side surfaces 16*s* extending in the longitudinal direction of the first housing 11. The embedded part 15 of the first housing 11 includes the outer surface 15*b* extending in the longitudinal direction of the first housing 11 on the outside opposite the inner surface 15*c*. The outer surface 15*b* is covered by the molding material of the cover part 16. The embedded part 15 has the five surfaces thereof covered by the cover part 16. This structure allows the embedded part 15 of the left half body part 10A and the embedded part 15 of the right half body part 10B to be firmly joined together by the cover part 16, thereby achieving the precise formation of the first protruding end part 18 and tight connection between the left half body part 10A and the right half body part 10B.

Note that the disclosure herein describes features relating to suitable exemplary embodiments. Various other embodiments, modifications, and variations within the scope and spirit of Scope of the Patent Claims appended hereto will naturally be conceived of by those skilled in the art upon review of the disclosure herein. For example, the staggered arrangement of the terminals does not have to be regular. In addition, the arrangement of the terminals on the left and right half body parts do not need to be the same. Furthermore, the left and right half body parts do not need to be axially symmetric.

INDUSTRIAL APPLICABILITY

The present disclosure can be applied to a connector.

The invention claimed is:

1. A connector, comprising:

a first half body part including a first housing having opposite first and second ends, a first embedded part connected to the first end of the first housing, a second embedded part connected to the second end of the first housing, the first housing and the first and second embedded parts extending in a longitudinal direction;

a plurality of conductive first terminals mounted to the first housing, and wherein the first housing is a member integrated with the first terminals;

a second half body part including a second housing having opposite first and second ends, a third embedded part connected to the first end of the second housing, a fourth embedded part connected to the second end of the second housing, the second housing and the third and fourth embedded parts extending in a longitudinal direction;

a plurality of conductive second terminals mounted to the second housing, wherein the second housing is a member integrated with the second terminals;

wherein the first and second housings are opposite to each other and are separated from each other by a through hole extending between the first ends and the second ends of the housings; and a first cover part that covers at least part of the first and third embedded parts such that the first cover part is a member integrated with the first and third embedded parts; and a second cover part that covers at least part of the second and fourth embedded parts such that the second cover part is a member integrated with the second and fourth embedded parts.

2. The connector according to claim 1, wherein the first and third embedded parts are completely covered by the first cover part, wherein the first cover part has a first end wall inner surface between the first and second housings, and the second and fourth embedded parts are completely covered by the second cover part, wherein the second cover part has a second end wall inner surface between the respective housings, the end wall inner surfaces facing each other.

3. The connector according to claim 1, wherein each embedded part has an inner surface, an outer surface opposite the inner surface, upper and lower surfaces connecting the inner surface and the outer surface, and an end surface located at one end in the longitudinal direction, wherein the inner surfaces of the first and third embedded parts face each other, and the inner surfaces of the second and fourth embedded parts face each other, at least the inner surface, the outer surface, the upper surface, the lower surface, and the end surface of the first and third embedded parts are covered by the first cover part, and at least the inner surface, the outer surface, the upper surface, the lower surface, and the end surface of the second and fourth embedded parts are covered by the second cover part.

4. The connector according to claim 1, wherein each embedded part includes an inclined inner surface, the inclined inner surfaces of the first and third embedded parts facing each other such that a first gap becomes larger between the first and third embedded parts in the longitudinal direction of the housing, the first cover part includes a first end wall inner surface between the first and third embedded parts in the longitudinal direction of the housing, the first end wall inner surface is formed by injecting a molding material for the first cover part into the gap between the inclined inner surfaces of the first and third embedded parts, and the inclined inner surfaces of the second and fourth embedded parts facing each other such that a second gap becomes larger between the second and fourth embedded parts in the longitudinal direction of the housing, the second cover part includes a second end wall inner surface between the second and fourth embedded parts in the longitudinal direction of the housing, the second end wall inner surface is formed by injecting a molding material for the second cover part into the gap between the second inclined inner surfaces.

5. The connector according to claim 1, further comprising a first extension end part extending in the longitudinal direction between the first end of the first housing and the first embedded part, a second extension end part extending in the longitudinal direction between the second end of the first housing and the second embedded part, a third extension end part extending in the longitudinal direction between the first end of the second housing and the third embedded part, and a fourth extension end part extending in the longitudinal direction between the second end of the second housing and the fourth embedded part.

6. The connector according to claim 5, wherein each extension end part is inwardly inclined in a width direction of the respective housing, and each cover part has a width less than a width of the first and second housings.

7. A connector pair, comprising the connector according to claim 1 and a mating connector to mate with the connector.

8. A connector pair, comprising the connector according to claim 2 and a mating connector to mate with the connector.

9. The connector according to claim 2, further comprising a first extension end part extending in the longitudinal direction between the first end of the first housing and the first embedded part, a second extension end part extending in the longitudinal direction between the second end of the first housing and the second embedded part, a third extension end part extending in the longitudinal direction between the first end of the second housing and the third embedded part, and a fourth extension end part extending in the longitudinal direction between the second end of the second housing and the fourth embedded part.

10. The connector according to claim 9, wherein each extension end part is inwardly inclined in a width direction of the respective housing, and each cover part has a width less than a width of the first and second housings.

11. A connector pair, comprising the connector according to claim 3 and a mating connector to mate with the connector.

12. The connector according to claim 3, further comprising a first extension end part extending in the longitudinal direction between the first end of the first housing and the first embedded part, a second extension end part extending in the longitudinal direction between the second end of the first housing and the second embedded part, a third extension end part extending in the longitudinal direction between the first end of the second housing and the third embedded part, and a fourth extension end part extending in the longitudinal direction between the second end of the second housing and the fourth embedded part.

13. The connector according to claim 12, wherein each extension end part is inwardly inclined in a width direction of the respective housing, and each cover part has a width less than a width of the first and second housings.

14. A connector pair, comprising the connector according to claim 4 and a mating connector to mate with the connector.

15. The connector according to claim 4, further comprising a first extension end part extending in the longitudinal direction between the first end of the first housing and the first embedded part, a second extension end part extending in the longitudinal direction between the second end of the first housing and the second embedded part, a third extension end part extending in the longitudinal direction between the first end of the second housing and the third embedded part, and a fourth extension end part extending in the longitudinal direction between the second end of the second housing and the fourth embedded part.

16. The connector according to claim 15, wherein each extension end part is inwardly inclined in a width direction of the respective housing, and each cover part has a width less than a width of the first and second housings.

17. A connector pair, comprising the connector according to claim 5 and a mating connector to mate with the connector.

18. A connector pair, comprising the connector according to claim 6 and a mating connector to mate with the connector.

19. A connector, comprising:

a first half body part including a first housing having opposite first and second ends, a first embedded part connected to the first end of the first housing, a second embedded part connected to the second end of the first housing, the first housing and the first and second embedded parts extending in a longitudinal direction;

a plurality of conductive first terminals mounted to the first housing, and wherein the first housing is a member integrated with the first terminals;

a second half body part including a second housing having opposite first and second ends, a third embedded part connected to the first end of the second housing, a fourth embedded part connected to the second end of the second housing, the second housing and the third and fourth embedded parts extending in a longitudinal direction;

a plurality of conductive second terminals mounted to the second housing, wherein the second housing is a member integrated with the second terminals, wherein each embedded part includes an inclined inner surface, the inclined inner surfaces of the first and third embedded parts facing each other such that a first gap becomes larger between the first and third embedded parts in the longitudinal direction of the housing, and the inclined inner surfaces of the second and fourth embedded parts facing each other such that a second gap becomes larger between the second and fourth embedded parts in the longitudinal direction of the housing, wherein the first and second housings are opposite to each other; and a first cover part covering at least part of the first and third embedded parts such that the first cover part is a member integrated with the first and third embedded parts, the first cover part includes a first end wall inner surface between the first and third embedded parts in the longitudinal direction of the housing, the first end wall inner surface is formed by injecting a molding material for the first cover part into the gap between the inclined inner surfaces of the first and third embedded parts; and a second cover part covering at least part of the second and fourth embedded parts such that the second cover part is a member integrated with the second and fourth embedded parts, and the second cover part includes a second end wall inner surface between the second and fourth embedded parts in the longitudinal direction of the housing, the second end wall inner surface is formed by injecting a molding material for the second cover part into the gap between the second inclined inner surfaces.

20. A connector, comprising:

a first half body part including a first housing having opposite first and second ends, a first extension end part extending in a longitudinal direction from the first end of the first housing, a first embedded part extending in the longitudinal direction from the first extension end part, a second extension end part extending in the longitudinal direction from the second end of the first housing, a second embedded part extending in the longitudinal direction from the second extension end part, wherein the first and second extension end parts are each inwardly inclined in a width direction of the first housing;

a plurality of conductive first terminals mounted to the first housing, and wherein the first housing is a member integrated with the first terminals;

a second half body part including a second housing having opposite first and second ends, a third extension end part extending in a longitudinal direction from the first end of the second housing, a third embedded part extending in the longitudinal direction from the third extension end part, a fourth extension end part extending in the longitudinal direction from the second end of the second housing, a fourth embedded part extending in the longitudinal direction from the fourth extension end part, wherein the third and fourth extension end parts are each inwardly inclined in a width direction of the second housing;

a plurality of conductive second terminals mounted to the second housing, wherein the second housing is a member integrated with the second terminals;

wherein the first and second housings are opposite to each other;

a first cover part covering at least part of the first and third embedded parts such that the first cover part is a member integrated with the first and third embedded parts; and a second cover part covering at least part of the second and fourth embedded parts such that the second cover part is a member integrated with the second and fourth embedded parts, each cover part has a width less than a width of the first and second housings.

* * * * *